United States Patent
Chi

(10) Patent No.: US 9,355,110 B1
(45) Date of Patent: May 31, 2016

(54) DYNAMIC PRESENTATION OF DATA ITEMS BASED ON PRIORITIZED ASSOCIATIONS

(75) Inventor: Liang-Yu (Tom) Chi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 250 days.

(21) Appl. No.: 13/422,535

(22) Filed: Mar. 16, 2012

Related U.S. Application Data

(60) Provisional application No. 61/507,787, filed on Jul. 14, 2011.

(51) Int. Cl.
*G06F 17/30* (2006.01)
*G06F 11/30* (2006.01)

(52) U.S. Cl.
CPC ...... *G06F 17/30144* (2013.01); *G06F 11/3089* (2013.01)

(58) Field of Classification Search
CPC .............. G06F 11/3089; G06F 17/30144
See application file for complete search history.

(56) References Cited

U.S. PATENT DOCUMENTS

| | | | |
|---|---|---|---|
| 6,018,723 A | 1/2000 | Siegel et al. | |
| 6,038,333 A | 3/2000 | Wang | |
| 6,598,030 B1 | 7/2003 | Siegel et al. | |
| 6,614,408 B1* | 9/2003 | Mann | 345/8 |
| 7,035,742 B2 | 4/2006 | Klefenz et al. | |
| 7,107,539 B2 | 9/2006 | Abbott et al. | |
| 7,130,866 B2 | 10/2006 | Schaffer | |
| 7,480,640 B1 | 1/2009 | Elad et al. | |
| 7,627,370 B2 | 12/2009 | Marks | |
| 7,702,599 B2 | 4/2010 | Widrow | |
| 7,842,874 B2 | 11/2010 | Jehan | |
| 7,844,609 B2 | 11/2010 | Kenedy et al. | |
| 7,925,492 B2 | 4/2011 | Visel | |
| 7,925,993 B2 | 4/2011 | Williams | |
| 8,812,419 B1* | 8/2014 | Teller | G06Q 10/10 706/46 |
| 2002/0083025 A1 | 6/2002 | Robarts et al. | |
| 2004/0083232 A1 | 4/2004 | Ronnewinkel et al. | |
| 2006/0106825 A1* | 5/2006 | Cozzi | 707/100 |
| 2006/0242178 A1 | 10/2006 | Butterfield et al. | |
| 2007/0136375 A1 | 6/2007 | Ando et al. | |

(Continued)

OTHER PUBLICATIONS

Panigrahy et al., "Finding Frequent Elements in Non-bursty Streams," ESA 2007, LNCS 4698, pp. 53-62, 2007, Retrieved from the Internet: http://research.microsoft.com/pubs/65179/esafreq07.pdf.

(Continued)

*Primary Examiner* — Robert Beausoliel, Jr.
*Assistant Examiner* — Nirav K Khakhar
(74) *Attorney, Agent, or Firm* — McDonnell Boehnen Hulbert & Berghoff

(57) ABSTRACT

An example method involves: (i) maintaining an attribute-association database comprising data for a set of data items, wherein the data for a given one of the data items specifies for each of one or more attributes from a set of attributes, (a) an associative value, and (b) a temporal-decay value; (ii) detecting an event, wherein the event is associated with one or more event attributes; (iii) determining a relevance of a given one of the data items to the detected event based on a selected one or more of (a) the associative values and (b) the temporal-decay values; (iv) selecting at least one data item, wherein the at least one data item is selected from a set of the data items based on the respective relevancies of the data items in the set; and (v) providing an indication of the at least one selected data item.

29 Claims, 15 Drawing Sheets

(56) References Cited

U.S. PATENT DOCUMENTS

| | | | |
|---|---|---|---|
| 2007/0208684 A1* | 9/2007 | Isozaki et al. | ..................... 707/1 |
| 2007/0282765 A1 | 12/2007 | Visel et al. | |
| 2008/0243741 A1 | 10/2008 | Visel et al. | |
| 2008/0275865 A1* | 11/2008 | Kretz et al. | ....................... 707/5 |
| 2008/0301175 A1* | 12/2008 | Applebaum | ........ G06F 17/3051 |
| 2009/0238419 A1 | 9/2009 | Steinberg et al. | |
| 2009/0265106 A1 | 10/2009 | Bearman et al. | |
| 2010/0057555 A1 | 3/2010 | Butterfield et al. | |
| 2010/0076274 A1 | 3/2010 | Severson | |
| 2013/0336629 A1* | 12/2013 | Mulholland | ............. H04N 9/87 386/230 |

OTHER PUBLICATIONS

Rhodes, B., "The wearable remembrance agent: a system for augmented memory," Personal Technologies Journal Special Issue on Wearable Computing, Personal Technologies (1997) 1:218-224, Retrieved from the Internet: http://alumni.media.mit.edu~rhodes/Papers/wear-ra-personaltech/index.html.

Valstar, M. F., "Timing is everything a spatio-temporal approach to the analysis of facial actions," Feb. 2008, Retrieved from the Internet: http://www.doc.ic.ac.uk/~mvalstar/Documents/thesisValstar.pdf.

* cited by examiner

| | Attribute 1 | Attribute 2 | Attribute 3 | Attribute 4 | Attribute 5 |
|---|---|---|---|---|---|
| Data Item 1 | VALUE  1  2 | -  0  0 | -  0  0 | -  0  0 | -  0  0 |
| Data Item 2 | VALUE  3  2 | -  0  0 | VALUE  4  3 | -  0  0 | -  0  0 |
| Data Item 3 | -  0  0 | -  0  0 | -  0  0 | -  0  0 | -  0  0 |
| Data Item 4 | -  0  0 | VALUE  5  5 | -  0  0 | VALUE  5  5 | VALUE  3  2 |
| Data Item 5 | -  0  0 | -  0  0 | VALUE  1  1 | -  0  0 | VALUE  1  0 |

FIG. 6

DYNAMIC PRESENTATION OF DATA ITEMS BASED ON PRIORITIZED ASSOCIATIONS

CROSS-REFERENCE TO RELATED APPLICATION

The present application claims priority to U.S. Provisional Application Ser. No. 61/507,787, filed on Jul. 14, 2011, the entire contents of which are incorporated by reference.

BACKGROUND

Unless otherwise indicated herein, the materials described in this section are not prior art to the claims in this application and are not admitted to be prior art by inclusion in this section.

Computing systems such as personal computers, laptop computers, tablet computers, and cellular phones, among many other types of Internet-capable computing systems, are increasingly prevalent in numerous aspects of modern life. As computing systems become progressively more integrated with users' everyday life, the convenience, efficiency, and intuitiveness of the manner in which users interact with the computing systems becomes progressively more important.

The trend toward miniaturization of computing hardware, peripherals, as well as sensors, detectors, and image and audio processors, among other technologies, has helped open up a field sometimes referred to as "wearable computing." Wearable computers are, generally, highly portable, and may be designed to be usable at any time, with a minimum amount of cost or distraction from the wearer's primary task. That is, a wearable computer user's primary task may not be using the computer. Instead, it may be dealing with their environment while the computer plays a secondary, support, role. Note that such a secondary function need not be performed by a computer that is "wearable" per se; that is, other computing systems (e.g., other portable computing systems) may also support users' activities in a secondary capacity.

The secondary-task nature of such computing systems make them a natural match for computing applications that continuously run in the background, sensing their environment and occasionally proactively acting on behalf of their users. Nonetheless, to date, techniques for interacting with such computing systems are often considered inconvenient, inefficient, and/or non-intuitive by users. An improvement is therefore desired.

SUMMARY

The systems and methods described herein may help to provide for more convenient, efficient, and/or intuitive access of data by users of computing systems. More specifically, the systems and methods described herein may assist the user with certain memory and recall functions associated with accessing a given data file in a manner that, in at least some aspects, mimics cognitive memory and recall functions of the human brain. In an example embodiment, a computing system automatically (i) associates various attributes with given data items and (ii) automatically recalls such data items based on the attributes and presents them to a user. The computing system may decrease (or increase) the frequency, or likelihood, that a given data item will be recalled based on at least one of an associative value and a temporal-decay value that is respectively associated with various attributes of the given data item. The associative value may be determined based on, for example, the manner in which the data item is accessed in association with the respective attribute. The temporal-value may be determined based on, for example, the frequency in which the data item is accessed more generally.

An example embodiment may involve a wearable computing system that continuously "watches over the shoulder" of a user, collecting information about the user's environment (e.g., via sensors such as cameras, microphones, and other input devices), and responsively indicates data items to the user (e.g., via a graphical display, a speaker, and other output devices). Such an embodiment may include eyeglasses having lenses that are arranged to provide the graphical display close to the user's eye as part of a "head-mountable display" that allows the users to interact in real time with an augmented, or virtual, reality. Such an embodiment may include the entirety of the computing system within the wearable device (i.e., the eyeglasses) itself and/or may be networked with other computer systems. Other examples and variations, some of which are discussed herein, are possible as well.

In one aspect, an example system may include a non-transitory computer-readable medium and program instructions stored on the non-transitory computer-readable medium and executable by a processor to: (i) maintain an attribute-association database comprising data for a set of data items, wherein the data for a given one of the data items specifies for each of one or more attributes from a set of attributes, (a) an associative value that indicates an association between the attribute and the data item, and (b) a temporal-decay value; (ii) detect an event, wherein the event is associated with one or more event attributes, wherein the event attributes are from the set of attributes; (iii) determine a relevance of a given one of the data items to the detected event based on a selected one or more of (a) the associative values that indicate the association between the event attributes and the given data item and (b) the temporal-decay values; (iv) select at least one data item, wherein the at least one data item is selected from a set of the data items based on the respective relevancies of the data items in the set; and (v) provide an indication of the at least one selected data item via at least one output device.

In another aspect, an example system may include: (i) means for maintaining an attribute-association database comprising data for a set of data items, wherein the data for a given one of the data items specifies for each of one or more attributes from a set of attributes, (a) an associative value that indicates an association between the attribute and the data item, and (b) a temporal-decay value; (ii) means for detecting an event, wherein the event is associated with one or more event attributes, wherein the event attributes are from the set of attributes; (iii) means for determining a relevance of a given one of the data items to the detected event based on a selected one or more of (a) the associative values that indicate the association between the event attributes and the given data item and (b) the temporal-decay values; (iv) means for selecting at least one data item, wherein the at least one data item is selected from a set of the data items based on the respective relevancies of the data items in the set; and (v) means for providing an indication of the at least one selected data item via at least one output device.

In another aspect, an example computer-implemented method may involve: (i) maintaining an attribute-association database comprising data for a set of data items, wherein the data for a given one of the data items specifies for each of one or more attributes from a set of attributes, (a) an associative value that indicates an association between the attribute and the data item, and (b) a temporal-decay value; (ii) detecting an event, wherein the event is associated with one or more event attributes, wherein the event attributes are from the set of attributes; (iii) determining a relevance of a given one of the data items to the detected event based on a selected one or more of (a) the associative values that indicate the association between the event attributes and the given data item and (b) the temporal-decay values; (iv) selecting at least one data item, wherein the at least one data item is selected from a set of the data items based on the respective relevancies of the data items in the set; and (v) providing an indication of the at least one selected data item via at least one output device.

In another aspect, an example system may include a non-transitory computer-readable medium and program instructions stored on the non-transitory computer-readable medium and executable by a processor to: (i) maintain an attribute-association database comprising data for a set of data items, wherein the set of data items comprises a calendar event, and wherein the data for the calendar event specifies, for a name attribute, (a) an associative value that indicates an association between the name attribute and the calendar event, and (b) a temporal-decay value; (ii) detect a face in received media; (iii) determine contact data that corresponds to the detected face, wherein the contact data includes at least the name attribute; (iv) determine a relevance of the calendar event to the detected face based on a selected one or more of (a) the associative value that indicates the association between the name attribute and the calendar event and (b) the temporal-decay value; (v) select the calendar event based on the relevance of the calendar event; and (vi) provide a visual indication of the calendar event via at least one graphical display.

In another aspect, an example system may include: (i) means for maintaining an attribute-association database comprising data for a set of data items, wherein the set of data items comprises a calendar event, and wherein the data for the calendar event specifies, for a name attribute, (a) an associative value that indicates an association between the name attribute and the calendar event, and (b) a temporal-decay value; (ii) means for detecting a face in received media; (iii) means for determining contact data that corresponds to the detected face, wherein the contact data includes at least the name attribute; (iv) means for determining a relevance of the calendar event to the detected face based on a selected one or more of (a) the associative value that indicates the association between the name attribute and the calendar event and (b) the temporal-decay value; (v) means for selecting the calendar event based on the relevance of the calendar event; and (vi) means for providing a visual indication of the calendar event via at least one graphical display.

In another aspect, an example computer-implemented method may involve: (i) maintaining an attribute-association database comprising data for a set of data items, wherein the set of data items comprises a calendar event, and wherein the data for the calendar event specifies, for a name attribute, (a) an associative value that indicates an association between the name attribute and the calendar event, and (b) a temporal-decay value; (ii) detecting a face in received media; (iii) determining contact data that corresponds to the detected face, wherein the contact data includes at least the name attribute; (iv) determining a relevance of the calendar event to the detected face based on a selected one or more of (a) the associative value that indicates the association between the name attribute and the calendar event and (b) the temporal-decay value; (v) selecting the calendar event based on the relevance of the calendar event; and (vi) providing a visual indication of the calendar event via at least one graphical display.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 6 shows a simplified depiction of an attribute-association database in accordance with an example embodiment.

DETAILED DESCRIPTION

Figure 1A:
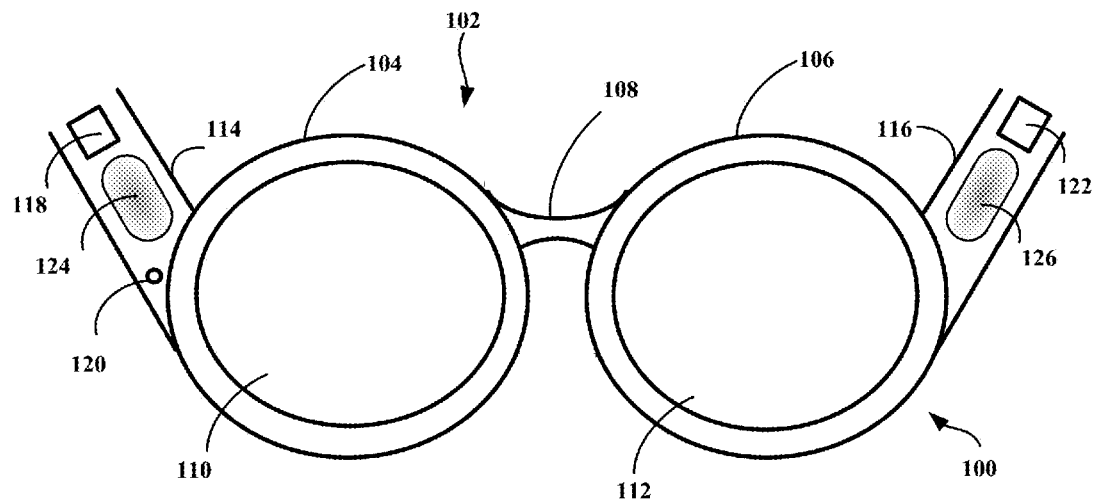
FIG. 1A shows a first view of an example wearable computing system in accordance with an example embodiment.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

Modern portable computing systems, including wearable computing systems, are commonly limited, at least in one respect, by the manner in which they access computer data. For example, common methods for accessing data involve the user accessing the data by way of filename (forcing the user to recall the name of the file) and the user browsing data files (forcing the user to scan a list and recognize the name of the file). While these methods do not require many computing resources and are easy to implement by computing system designers/coders, they require that the user carry out essentially the entirety of certain memory and recall functions associated with accessing a given data file.

The disclosure herein generally relates to methods involving a computing system detecting an event and then automatically recalling, and indicating to a user, a data item that is associated with the detected event. The data items may be presented to the user based on prioritization of attributes associated with the data items. The methods disclosed herein may be carried out by a wearable computing system and, accordingly, the event may be detected based, at least in part, on various environmental information, sensory information, input data from various input devices, and/or data collected by various sensors of the wearable computing system. In turn, the data item associated with the detected event may be indicated to the user by way of a head-mountable display that is part of the wearable computing system.

As a non-limiting, contextual example of a situation in which the methods disclosed herein may be implemented, consider a user of a wearable-computing system that is at a social function, for example a baseball game. The wearable-computing system may recognize, based on various input data, the face of a work acquaintance that is also a friend of the user. The wearable-computing system may then present to the user one or more of various pictures and/or emails form the user based on how the user has interacted with the pictures and/or emails in the past. For example, the wearable-computing system may present to the user a picture of the user and the friend that was taken at the last baseball game the user attended, and that was recently accessed by the user, as opposed to a picture of the friend that is the friend's work-directory photo. As another example, the wearable-computing system may present to the user the last-accessed social e-mail (as opposed to work-related e-mail) received from the friend given that the wearable-computing system has recognized the friend in a social context (as opposed to a work context). This is but one high-level overview of possible functionality of the disclosed method that should not be taken to be limiting.

Further, it should be understood, that the disclosure herein does not necessarily require a wearable computing system, and could be carried out by any other suitable computing system. Thus, although reference may be made to a wearable computing system herein, this is for purposes of example and explanation only, and should not be taken to be limiting.

Further, the disclosure herein generally involves methods that enable a computing system to store and recall data items in a manner that mimics, in at least some aspects, memory and recall cognitive functions of the human brain. For example, in one aspect, the disclosed methods may involve associating an associative value with respective attributes of a given data item. As discussed further below, such an associative value may vary with time; for instance, it may increase upon accessing the data item based on the attribute, or it may decrease, over time, upon not accessing the data item based on the attribute. The associative value may be increased and/or decreased based on, for example, the manner, quality, and/or nature in which the data item is accessed in association with the attribute.

In another aspect, the disclosed methods may involve associating a temporal-decay value with respective attributes of a given data item. As discussed further below, such a temporal-decay value may vary with time; for instance, it may increase upon accessing the data item based on the attribute, or it may decrease, over time, upon not accessing the data item based on the attribute. Generally, each of the associative value and the temporal-decay value may be determined according to any suitable formula or function. The temporal-decay value may be increased and/or decreased based on, for example, the time, frequency, and/or regularity in which the data item is accessed in association with the attribute. The formula or function applied to one of the associative value and the temporal-decay value may be different and each such function may be tailored so as to achieve desirable memory and recall functionality by the computing system.

2. Example System and Device Architecture

FIG. 1A depicts an example system 100 for receiving, transmitting and displaying data. Example system 100 is shown in the form of a wearable computing device. While FIG. 1A depicts eyeglasses 102 as an example of a wearable computing device, other types of wearable computing devices could additionally or alternatively be used. As illustrated in FIG. 1A, the eyeglasses comprise frame elements including lens-frames 104 and 106 and a center frame support 108, lens elements 110 and 112, and extending side-arms 114 and 116. Center frame support 108 and extending side arms 114 and 116 are configured to secure eyeglasses 102 to a user's face via a user's nose and ears, respectively. Each of frame elements 104 and 106, frame support 108, and extending side-arms 114 and 116 may be formed of a solid structure of plastic or metal, or may be formed of a hollow structure of similar material so as to allow wiring and component interconnects to be internally routed through eyeglasses 102. Each of lens elements 110 and 112 may be formed of any material that can suitably display a projected image or graphic. Each of lens elements 110 and 112 may also be sufficiently transparent to allow a user to see through the lens element. Combining these two features of lens elements 110 and 112 can facilitate an augmented reality, or heads-up display, where the projected image or graphic is superimposed over a real-world view as perceived by the user through lens elements 110 and 112.

Extending side-arms 114 and 116 are each projections that extend away from frame elements 104 and 106, respectively, and, in use, are positioned behind a user's ears to secure eyeglasses 102 to the user. Extending side-arms 114 and 116 may further secure eyeglasses 102 to the user by extending around a rear portion of the user's head. Additionally or alternatively, for example, the example system may connect to or be affixed within a head-mountable helmet structure. Other possibilities exist as well.

The example system may also include an on-board computing system 118, a video camera 120, a sensor 122, and finger operable touch pads 124, 126. On-board computing system 118 is shown to be positioned on extending side-arm 114 of eyeglasses 102; however, on-board computing system 118 may be provided on other parts of eyeglasses 102. On-board computing system 118 may be configured to receive and analyze data from video camera 120 and finger-operable touch pads 124 and 126 (and possibly from other sensory devices, user interfaces, or both) and generate images for output from lens elements 110 and 112.

Video camera 120 is shown as positioned on extending side-arm 114 of eyeglasses 102; however, video camera 120 may be provided on other parts of eyeglasses 102. Video camera 120 may be configured to capture images at various resolutions or at different frame rates. Many video cameras with a small form-factor, such as those used in cell phones or webcams, for example, may be incorporated into example system 100. Although FIG. 1A illustrates one video camera 120, more video cameras may be used, and each may be configured to capture the same view, or to capture different views. For example, video camera 120 may be forward facing to capture at least a portion of the real-world view perceived by the user. This forward facing image captured by video camera 120 may then be used to generate an augmented reality where computer generated images appear to interact with the real-world view perceived by the user.

Sensor 122 is shown mounted on extending side-arm 116 of eyeglasses 102; however, sensor 122 may be provided on other parts of eyeglasses 102. Sensor 122 may include one or more of a gyroscope or an accelerometer, for example. Other sensing devices may be included within sensor 122 or other sensing functions may be performed by sensor 122.

Finger-operable touch pads 124 and 126 are shown mounted on extending side-arms 114 and 116 of eyeglasses 102. Each of finger-operable touch pads 124 and 126 may be used by a user to input commands. Finger-operable touch pads 124 and 126 may sense at least one of a position and a movement of a finger via capacitive sensing, resistance sensing, or a surface acoustic wave process, among other possibilities. Finger-operable touch pads 124 and 126 may be capable of sensing finger movement in a direction parallel or planar to the pad surface, in a direction normal to the pad surface, or both, and may also be capable of sensing a level of pressure applied. Finger-operable touch pads 124 and 126 may be formed of one or more translucent or transparent insulating layers and one or more translucent or transparent conducting layers. Edges of finger-operable touch pads 124 and 126 may be formed to have a raised, indented, or roughened surface, so as to provide tactile feedback to a user when the user's finger reaches the end of finger-operable touch pads 124 and 126. Each of finger-operable touch pads 124 and 126 may be operated independently, and may provide a different function.

Figure 1B:
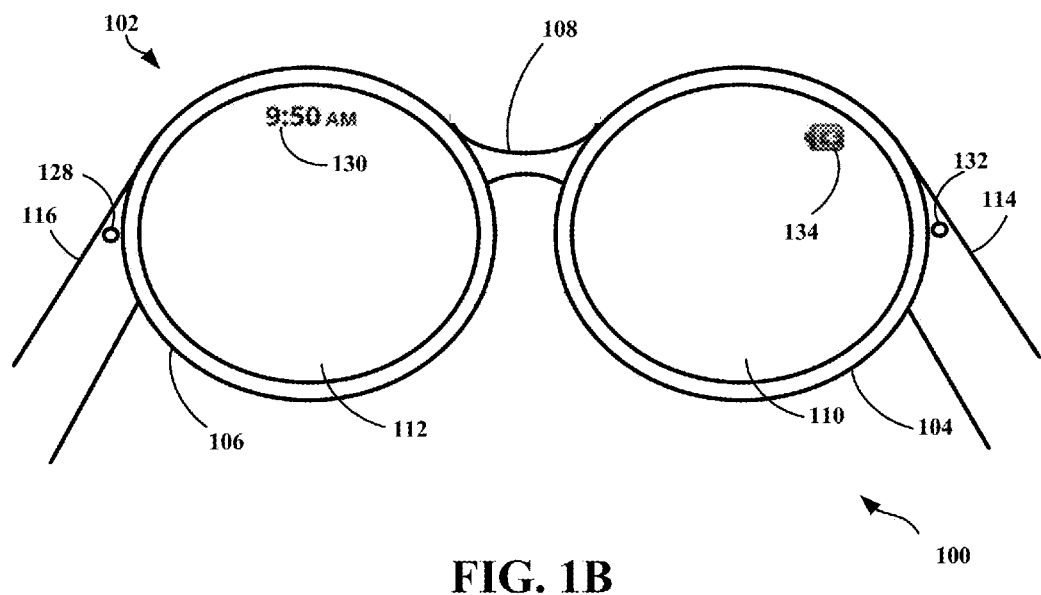
FIG. 1B shows a second view of the example wearable computing system shown in FIG. 1A.

FIG. 1B depicts an alternate view of example system 100 of FIG. 1A. As shown in FIG. 1B, lens elements 110 and 112 may act as display elements. Eyeglasses 102 may include a first projector 128 coupled to an inside surface of extending side-arm 116 and configured to project a display 130 onto an inside surface of lens element 112. Additionally or alternatively, a second projector 132 may be coupled to an inside surface of extending side-arm 114 and configured to project a display 134 onto an inside surface of lens element 110.

Lens elements 110 and 112 may act as a combiner in a light projection system and may include a coating that reflects the light projected onto them from projectors 128 and 132. In some embodiments, a special coating may not be used (e.g., when projectors 128 and 132 are scanning laser devices).

In alternative embodiments, other types of display elements may also be used. For example, lens elements 110 and 112 themselves may include: a transparent or semi-transparent matrix display, such as electroluminescent display or a liquid crystal display, one or more waveguides for delivering an image to the user's eyes, or other optical elements capable of delivering an in focus near-to-eye image to the user. A corresponding display driver may be disposed within frame elements 104 and 106 for driving such a matrix display. Alternatively or additionally, a laser or LED source and scanning system could be used to draw a raster display directly onto the retina of one or more of the user's eyes. Other possibilities exist as well.

Figure 2A:
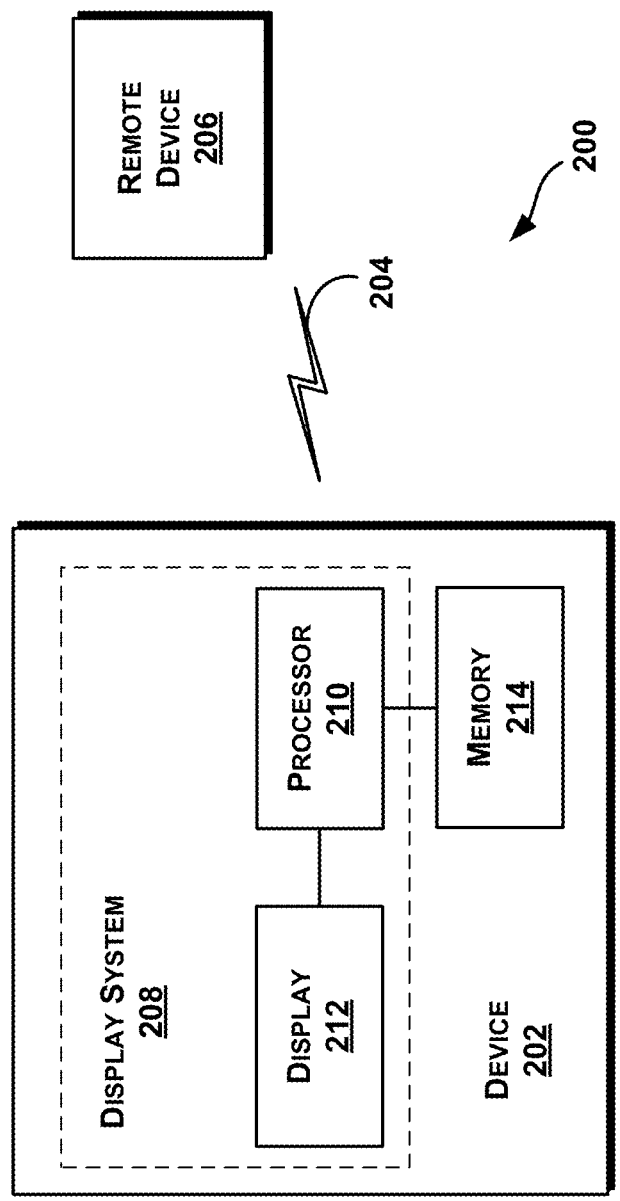
FIG. 2A shows a simplified block diagram of an example wearable computing device.

FIG. 2A illustrates a simplified block diagram of an example wearable-computing device. In one system 200, a device 202 communicates using a communication link 204 (e.g., a wired or wireless connection) to a remote device 206. Device 202 may be any type of device that can receive data and display information corresponding to or associated with the data. For example, device 202 may be a heads-up display system, such as eyeglasses 102 described with reference to FIGS. 1A and 1B.

Thus, device 202 may include display system 208 comprising a processor 210 and a display 112. Display 112 may be, for example, an optical see-through display, an optical see-around display, or a video see-through display. Processor 210 may by any type of processor, such as a microprocessor or a digital signal processor, for example. Device 202 may further include on-board data storage, such as memory 214 coupled to processor 210. Memory 214 may store software that can be accessed and executed by processor 210, for example.

Remote device 206 may be any type of computing device or transmitter including a laptop computer, a mobile telephone, a network server, etc., that is configured to transmit data to device 202. Remote device 206 and device 202 may contain hardware to enable communication link 204, such as processors, transmitters, receivers, antennas, etc.

In FIG. 2A, communication link 204 is illustrated as a wireless connection; however, wired connections may also be used. For example, communication link 204 may be a wired link via a serial bus such as a universal serial bus or a parallel bus. Such a wired connection may be a proprietary connection as well. Communication link 204 may also be a wireless connection that uses, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Remote device 206 may be accessible via the Internet and may comprise a computing cluster associated with a particular web service (e.g., social-networking, photo sharing, address book, etc.).

Figure 2B:
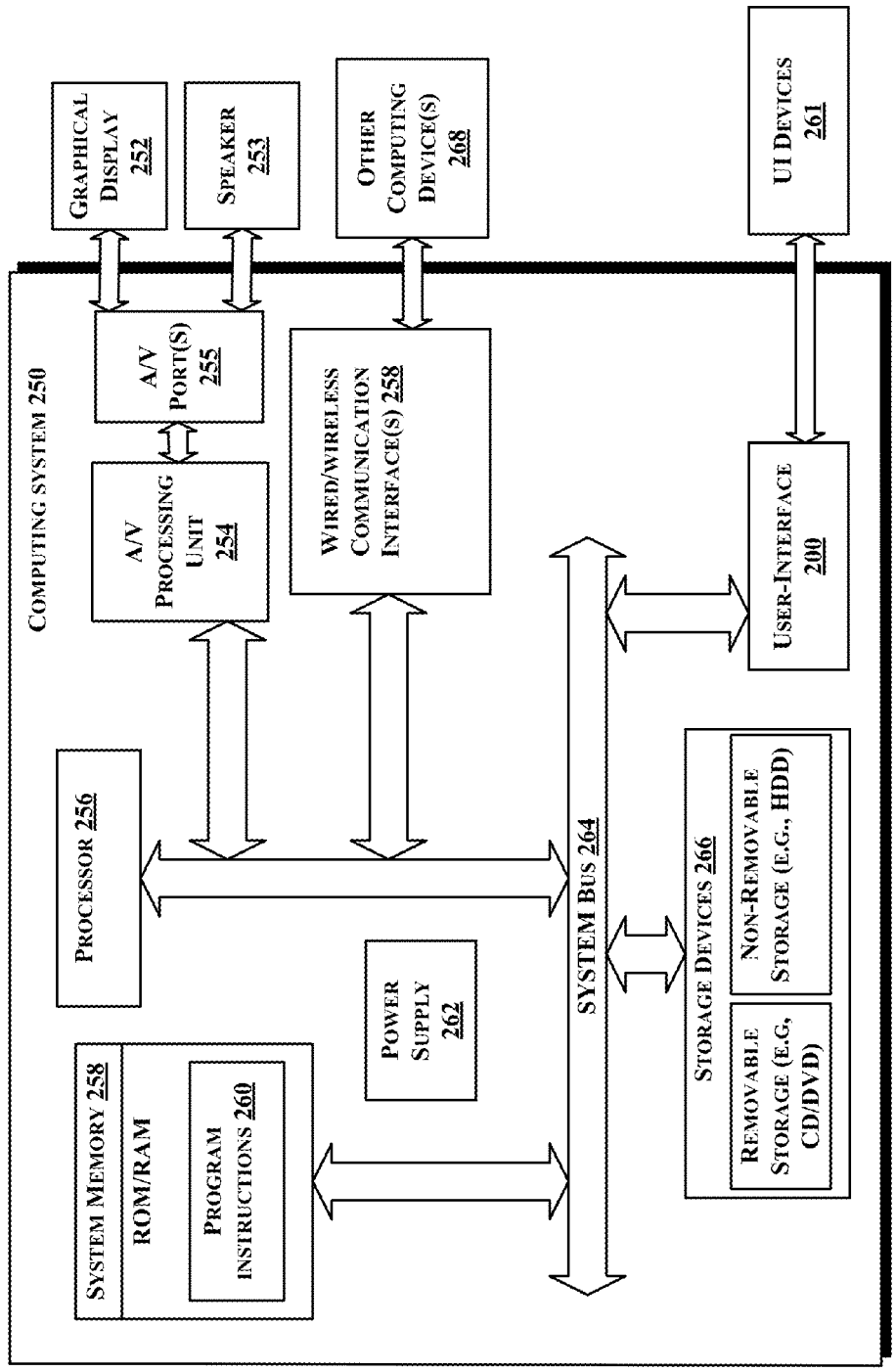
FIG. 2B shows a simplified block diagram depicting components of an example computing system.

With reference again to FIGS. 1A and 1B, recall that example system 100 may include, or may otherwise be communicatively coupled to, a computing system such as computing system 118. Such a computing system may take the form of example computing system 250 as shown in FIG. 2B. Additionally, one, or each, of device 202 and remote device 206 may take the form of computing system 250.

Computing system 250 may include at least one processor 256 and system memory 258. In an example embodiment, computing system 250 may include a system bus 264 that communicatively connects processor 256 and system memory 258, as well as other components of computing system 250. Depending on the desired configuration, processor 256 can be any type of processor including, but not limited to, a microprocessor (μP), a microcontroller (μC), a digital signal processor (DSP), or any combination thereof. Furthermore, system memory 258 can be of any type of memory now known or later developed including but not limited to volatile memory (such as RAM), non-volatile memory (such as ROM, flash memory, etc.) or any combination thereof.

An example computing system 250 may include various other components as well. For example, computing system 250 includes an A/V processing unit 254 for controlling graphical display 252 and speaker 253 (via A/V port 255), one or more communication interfaces 258 for connecting to other computing devices 268, and a power supply 262. Graphical display 252 may be arranged to provide a visual depiction of various input regions provided by user-interface 200, such as the depiction provided by user-interface graphical display 210. Note, also, that user-interface 200 may be compatible with one or more additional user-interface devices 261 as well.

Furthermore, computing system 250 may also include one or more data storage devices 266, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 250.

According to an example embodiment, computing system 250 may include program instructions that are stored in system memory 258 (and/or possibly in another data-storage medium) and executable by processor 256 to facilitate the various functions described herein including, but not limited to, those functions described with respect to FIGS. 3A-3G and FIG. 4. Although various components of computing system 250 are shown as distributed components, it should be understood that any of such components may be physically integrated and/or distributed according to the desired configuration of the computing system.

3. Example Methods

Figure 3A:
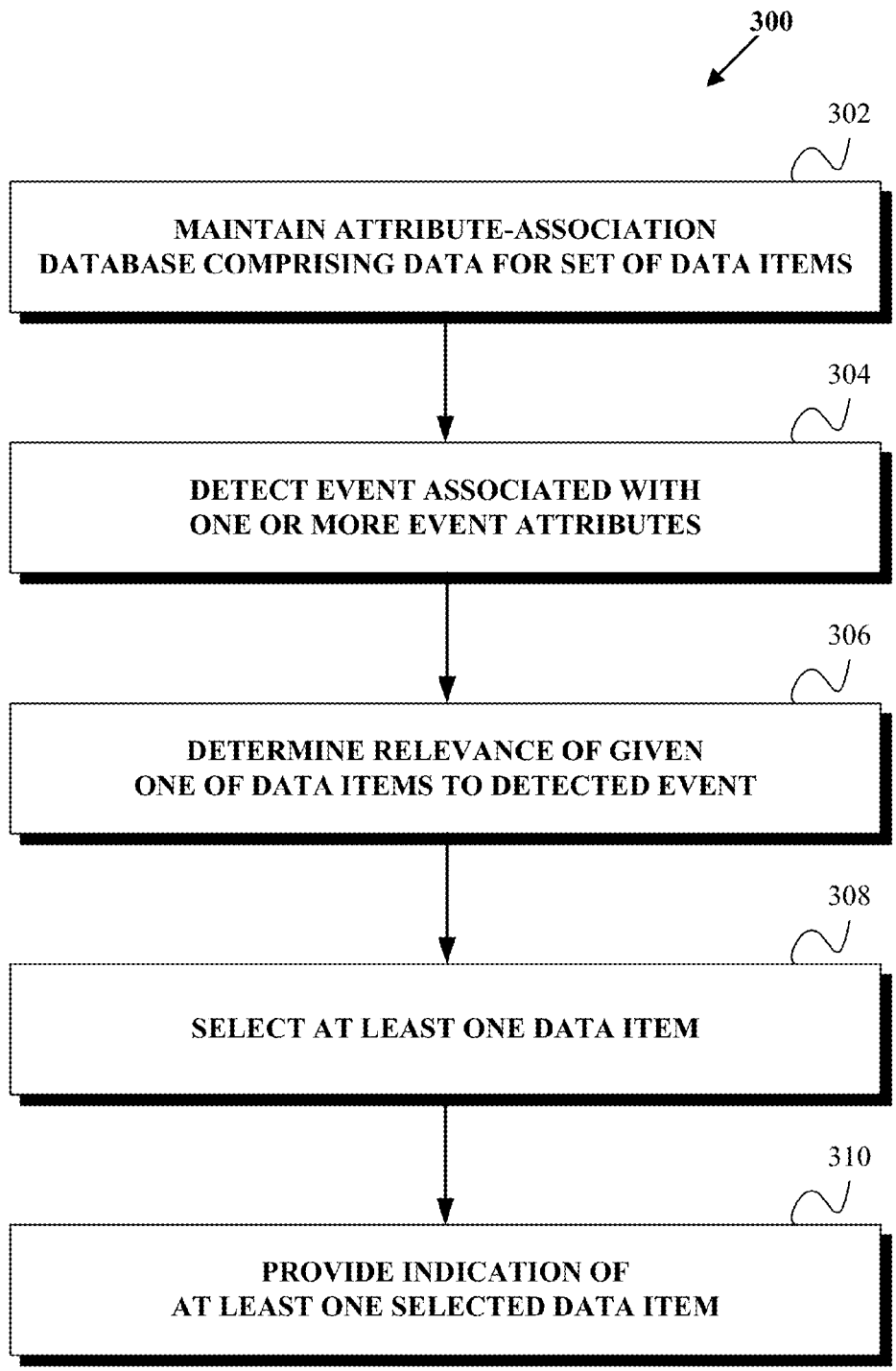
FIG. 3A shows a flowchart depicting a first example method for presentation of data items based on prioritized associations.

FIG. 3A shows a flowchart depicting a first example method 300 for presenting data items based on prioritized associations. As discussed further below, aspects of example method 300 may be carried out by any suitable computing system, or any suitable components thereof. Example method 300 begins at block 302 with the computing system maintaining an attribute-association database comprising data for a set of data items, wherein the data for a given one of the data items specifies for each of one or more attributes from a set of attributes, (a) an associative value that indicates an association between the attribute and the data item, and (b) a temporal-decay value. At block 304, the computing system detects an event, where the event is associated with one or more event attributes, where the event attributes are from the set of attributes. At block 306, the computing system determines a relevance of a given one of the data items to the detected event based on a selected one or more of (a) the associative values that indicate the association between the attributes and the given data item and (b) the temporal-decay values. At block 308, the computing system selects at least one data item, where the at least one data item is selected from a set of the data items based on the respective relevancies of the data items in the set. At block 310, the computing system provides an indication of the at least one selected data item via at least one output device. Each of the blocks shown with respect to FIG. 3A are discussed further below.

FIGS. 3B-3G each show a flowchart depicting further optional aspects of example methods for presentation of data items based on prioritized associations. Each of the blocks shown with respect to FIGS. 3B-3G are discussed further below.

Figure 4:
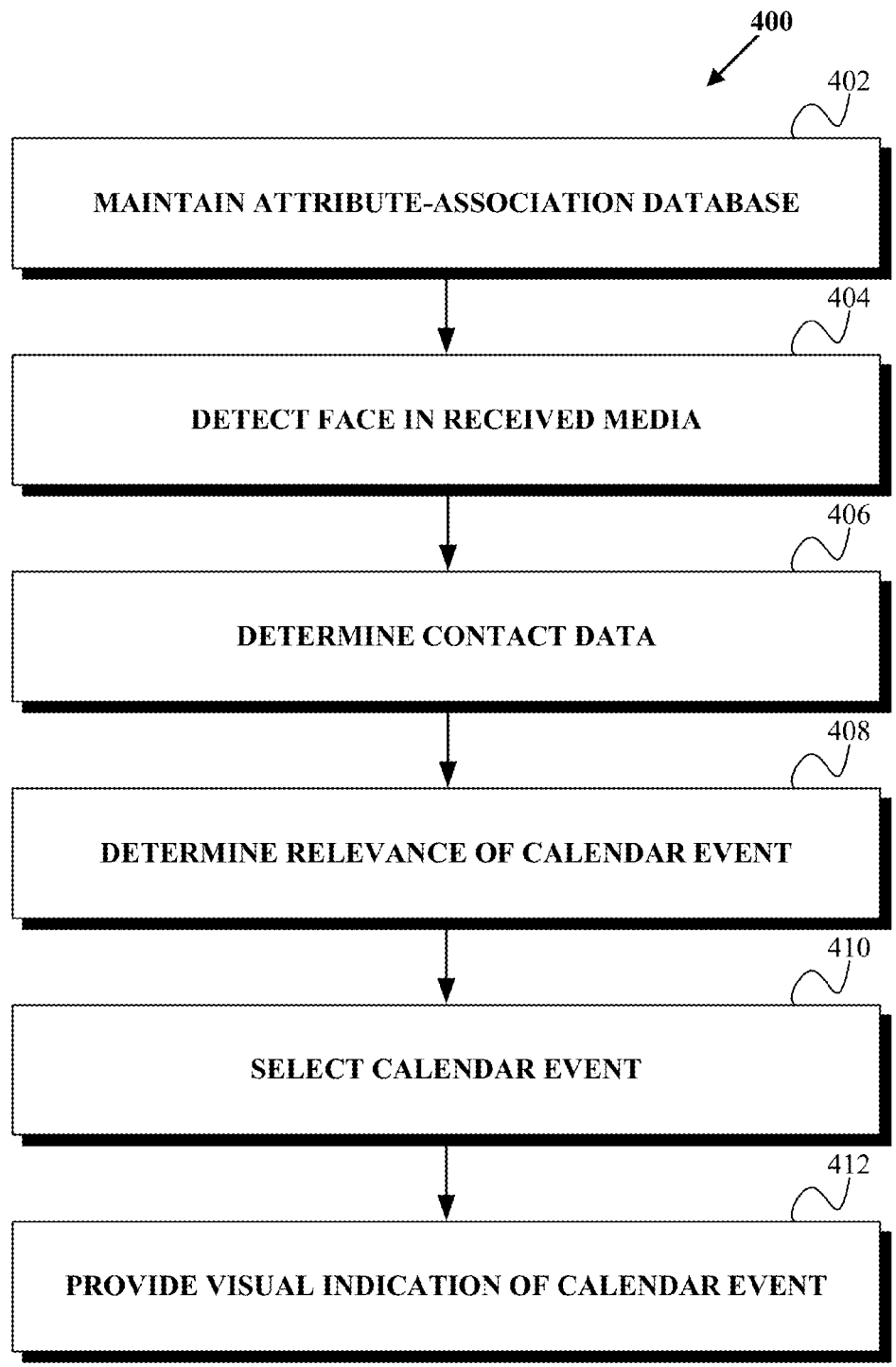
FIG. 4 shows a flowchart depicting a second example method for presentation of data items based on prioritized associations.

FIG. 4 shows a flowchart depicting a second example method 400 for presenting data items based on prioritized associations. Example method 400 begins at block 402 with maintaining an attribute-association database comprising data for a set of data items, where the set of data items comprises a calendar event, and where the data for the calendar event specifies, for a name attribute, (a) an associative value that indicates an association between the name attribute and the calendar event, and (b) a temporal-decay value. At block 404, the computing system detects a face in received media. At block 406, the computing system determines contact data that corresponds to the detected face, where the contact data includes at least the name attribute. At block 408, the computing system determines a relevance of the calendar event to the detected face based on a selected one or more of (a) the associative value that indicates the association between the name attribute and the calendar event and (b) the temporal-decay value. At block 410, the computing system selects the calendar event based on the relevance of the calendar event. And at block 412, the computing system provides a visual indication of the calendar event via at least one graphical display. Each of the blocks shown with respect to FIG. 4 are discussed further below.

Figure 5:
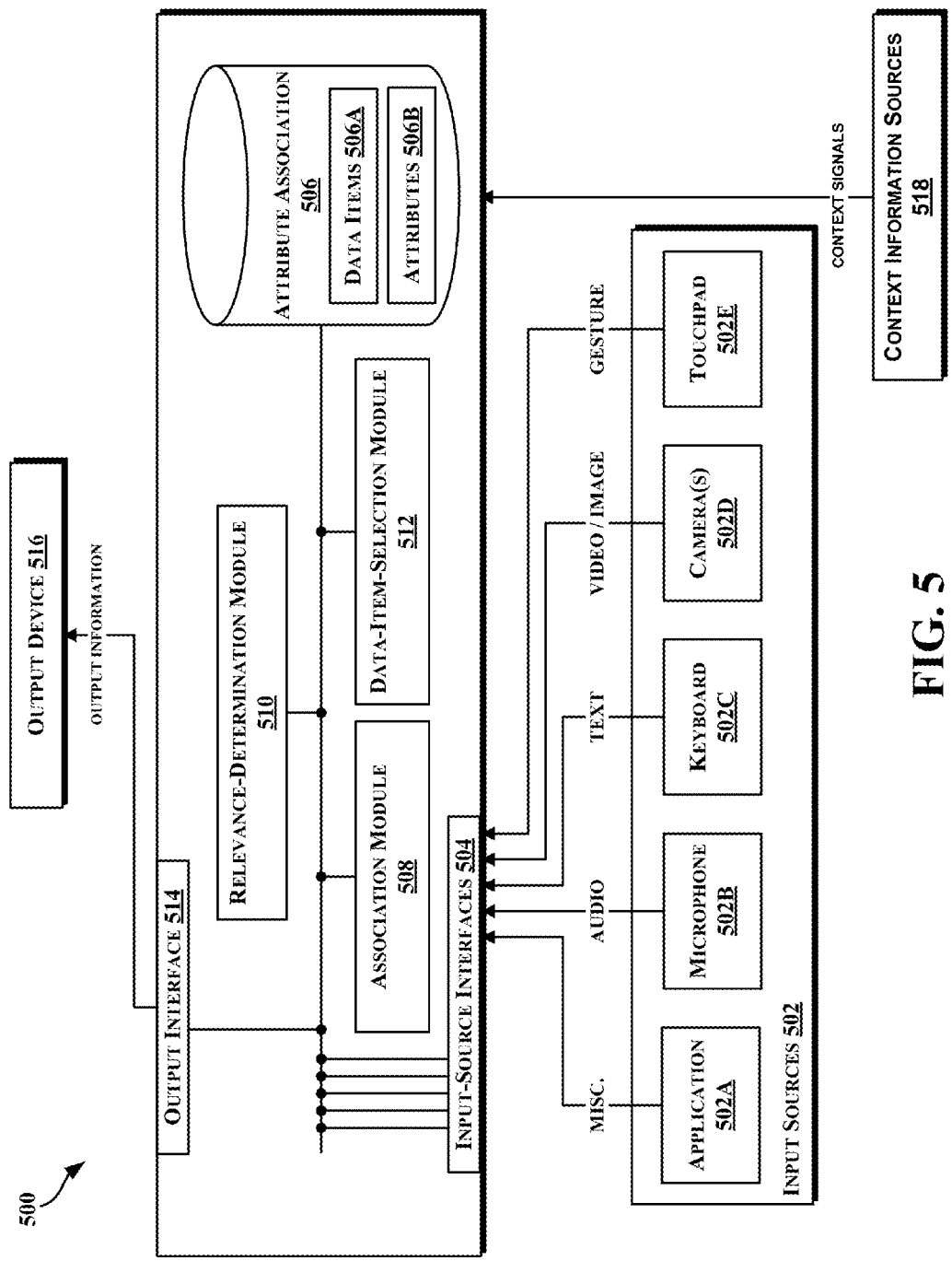
FIG. 5 shows a functional block diagram of an example computing system in accordance with an example embodiment.

FIG. 5 shows a functional block diagram of example computing system 500 in accordance with an example embodiment. Example computing system 500 is shown as including example functional components that may be used for carrying out aspects of the various methods described with respect to FIGS. 3A-3G and FIG. 4. As such, aspects of the various methods described with respect to FIGS. 3A-3G and FIG. 4 may be carried out by example computing system 500. Computing system 500 may also include any of those elements, devices, or functional components described with respect to computing system 250 as shown in FIG. 2B. Further, computing system 500 may be implemented as part of a system that includes a heads-up display, such as eyeglasses 102 described with reference to FIGS. 1A and 1B. Example computing system 500 is discussed further below in accordance with FIGS. 3A-3G and FIG. 4.

a. The First Example Method
i. Maintain Attribute-Association Database

Example method 300 begins at block 302 with computing system 500 maintaining attribute-association database 506. Attribute-association database 506 may include data for a set of data items 506A, where the data for a given one of the data items specifies for each of one or more attributes from a set of attributes 506B, (a) an associative value that indicates an association between the attribute and the data item, and (b) a temporal-decay value. FIG. 6 shows a simplified depiction of an attribute-association database table 600 in accordance with an example embodiment. Attribute-association database 506 may store data in a table such as attribute-association database table 600. Attribute-association database table 600 includes data-items 602 including data items 1-5 (which data items may take various forms), attributes 604 including attributes 1-5, and, for each entry in the database, an attribute value 606, an associative value 608, and a temporal-decay value 610. Attribute-association database table 600 is shown for purposes of example and explanation only, and should not be taken to be limiting. Attribute-association database 506 may store data in ways other than that shown by attribute-association database table 600.

Generally, data items 1-5 may be any desired type of data. For example, a given data item may be a multimedia-data object. Such as at least one of a picture file, a video file, an audio file, a word-processing file, and an e-mail file. Other examples of multimedia-data objects may exist as well. Although the data objects are described in this respect as "multimedia" data objects, this is for purposes of clarity, example, and explanation only, and should not be taken to be limiting. The term "multimedia" in this context is intended to mean any data object that may be displayed, played, shown, or otherwise indicated to a user. Other examples of multimedia-data objects exist as well.

As another example, a given data item may be a data pointer that specifies the location of at least one data object, such as any of those multimedia-data objects described above. For instance, the data item stored in attribute-association database table 600 may point to the location at which a given data object is stored in a local, or non-local (i.e., networked), storage device. Such a data pointer may be a uniform resource locator (URL), or web address, or may otherwise identify a data item stored on the Internet. In this way, access of attribute-association database table 600, and reference to a relevant one of data items 1-5, may provide computing system 500 with the necessary information to locate and, ultimately retrieve, a given data object.

In turn, attributes 1-5 may be any characteristic, trait, or quality of a given data item. Many examples of such attributes may exist and may include not only attributes associated with the data item itself (i.e., file name, file size, data of creation, etc.) but may also include other various types of metadata that describes the content, nature, or other contextual information associated with the data item. Examples of such attributes that may be associated with a data item that is a photo may include, without limitation, a name of an individual (e.g., the name of an individual in the photo), a location (e.g., the location at which the photo was taken), a time (e.g., the time at which the photo was taken), an event (e.g., an event during which a photo was taken), and a temperature (e.g., a temperature at the time/location the photo was taken).

Examples of such attributes that may be associated with a data item that is a word-processing file may include a name of an individual (e.g., the name of an individual that created the word-processing file and/or the name of an individual that last edited the word-processing file), a time (e.g., the time that the word-processing file was created and/or the time that the file was last edited), a length (e.g., the number of pages and/or number words contained in the word-processing file), a project (e.g., a project that the word-processing file was created for or in association with), and a workgroup (e.g., a group of individuals that may be interested in, or otherwise associated with, the word-processing file).

It should be understood that the examples of the photo and word-processing file provided above, including example attributes thereof, are provided for purposes of example and explanation only. Other examples of data items certainly exist, as do other examples of attributes.

More generally, any of attributes 1-5 may be any type of environmental attribute relating to a user's environment (i.e., surroundings, situation, or condition). Examples of such environmental attributes may include a time attribute, a location attribute, a temperature attribute, a motion attribute, and an audio attribute. Other examples of environmental attributes may exist.

Alternatively, any of attributes 1-5 may be any type of data-processed attribute that is generated, by computing system 500, based on an analysis of a given data item. That is, computing-system 500 may be configured to analyze (using any suitable technology including, but not limited to, facial-recognition technologies, speech-recognition technologies, etc.) a given data item and determine various characteristics of the given data item, at least some of which may then be associated with the given data item as attributes.

Further, any of attributes 1-5 may be any type of computing-usage attribute. Such an computing-usage attribute may include an access history of the given data item, where the access history indicates, for example, at least one of a number of times computing system 500 previously accessed the given data item, a frequency with which computing system 500 previously accessed the given data item, an amount of time since computing system 500 last accessed the given data item, a number of times computing system 500 previously accessed the given data item in association with an attribute of the detected event, and an access-quality metric of the latest access of the given data item.

The access-quality metric may include at least one of a duration of the access of the given data item, a purpose of the access of the given data item, and/or a computing-context of the access of the given data item. Accordingly, an access-quality metric may provide an indication of the importance of a data item by providing a quantization of, for example, the relevance, significance, and/or nature of the latest access of the data item. Thereby, for example, data items that have been accessed in a given manner may be more strongly associated with a given attribute relative to those data items that have not been accessed in such a manner.

The examples of attributes set forth above are but a few of the many potential examples of attributes that may be associated with data items. Those of skill in the art will appreciate that many other types of attributes, and/or metadata, may be associated with data items in accordance with the disclosure contained herein. Further, those of skill in the art will appreciate that multiple similar attributes may be present in attribute-association database table 600. That is, multiple attributes may be, for example, a name of an individual, and accordingly, more than one name may be associated with a given data item.

As shown, each entry in attribute-association database table 600 includes information including an attribute value 606, an associative value 608, and a temporal-decay value 610. Such information may, among other things, provide an indication of the extent of association of a given attribute with a given data item.

Attribute value 606 may be any particular instance of the applicable attribute, such as any of the attributes discussed above. For example, in the event that attribute 5 is the name of an individual, attribute value 606 may be the actual name of the individual (e.g., the individual's full name "John Smith," the individual's first name "John," or the individual's last name "Smith"). In the event that attribute 5 is a length of a multimedia data-object, attribute value 606 may be one of various lengths that may be relevant to the multimedia data-object (e.g., the number of words, characters, or pages in a word-processing document; or the amount of time in a video or audio file).

The examples of attribute values set forth above are but a few of the many potential examples of attribute values that may be associated with data items. Those of skill in the art will appreciate that many other types of attribute values may be associated with data items in accordance with the disclosure contained herein.

Each entry in attribute-association database table 600 also includes an associative value, such as associative value 608. Such an associative value may provide, for example, a measure of the manner, quality, and/or nature in which the data item is accessed based on the attribute. As a general matter, upon initially associating a given attribute with a given data item, the associative value may be set to a default-associative value. In an embodiment, associating a given attribute with a given data item may involve setting the associative value to a non-zero default-associative value. Thereafter, as will be discussed further below, the associative value may vary in time according to various considerations including, for example, an access history of the data item. Generally, the associative value may decrease at a pre-determined rate over a period of time during which the given data item is not accessed. Then, upon access of the given data item, the associative value may be set to an accessed-item associative value.

Each entry in attribute-association database table 500 also includes a temporal-decay value 610. Such a temporal-decay value may provide, for example, a quantitative measure of the time, frequency, and/or regularity in which the data item is accessed based on the attribute. As a general matter, upon initially associating a given attribute with a given data item, the temporal-decay value may be set to a default-temporal-decay value. In an embodiment, associating a given attribute with a given data item may involve setting the temporal-decay value to a non-zero default-temporal-decay value. Thereafter, as will be discussed further below, the temporal-decay value may vary in time according to various considerations, including, for example, the access history of the data item. Generally, the temporal-decay value may decrease at a pre-determined rate over a period of time during which the given data item is not accessed. Then, upon access of the given data item, the temporal-decay value may be set to an accessed-item temporal-decay value.

While certain aspects of determining each of the associative value and the temporal-decay value may be similar, other aspects may not be similar. For instance, each may similarly decrease over a period of time during which the first data item is not accessed by computing system 500. However, the formula, algorithm, or calculation by which the associative value and the temporal-decay value are determined may vary significantly. Examples of the determination of the associative value and the temporal-decay value are discussed further below.

Figure 3B:
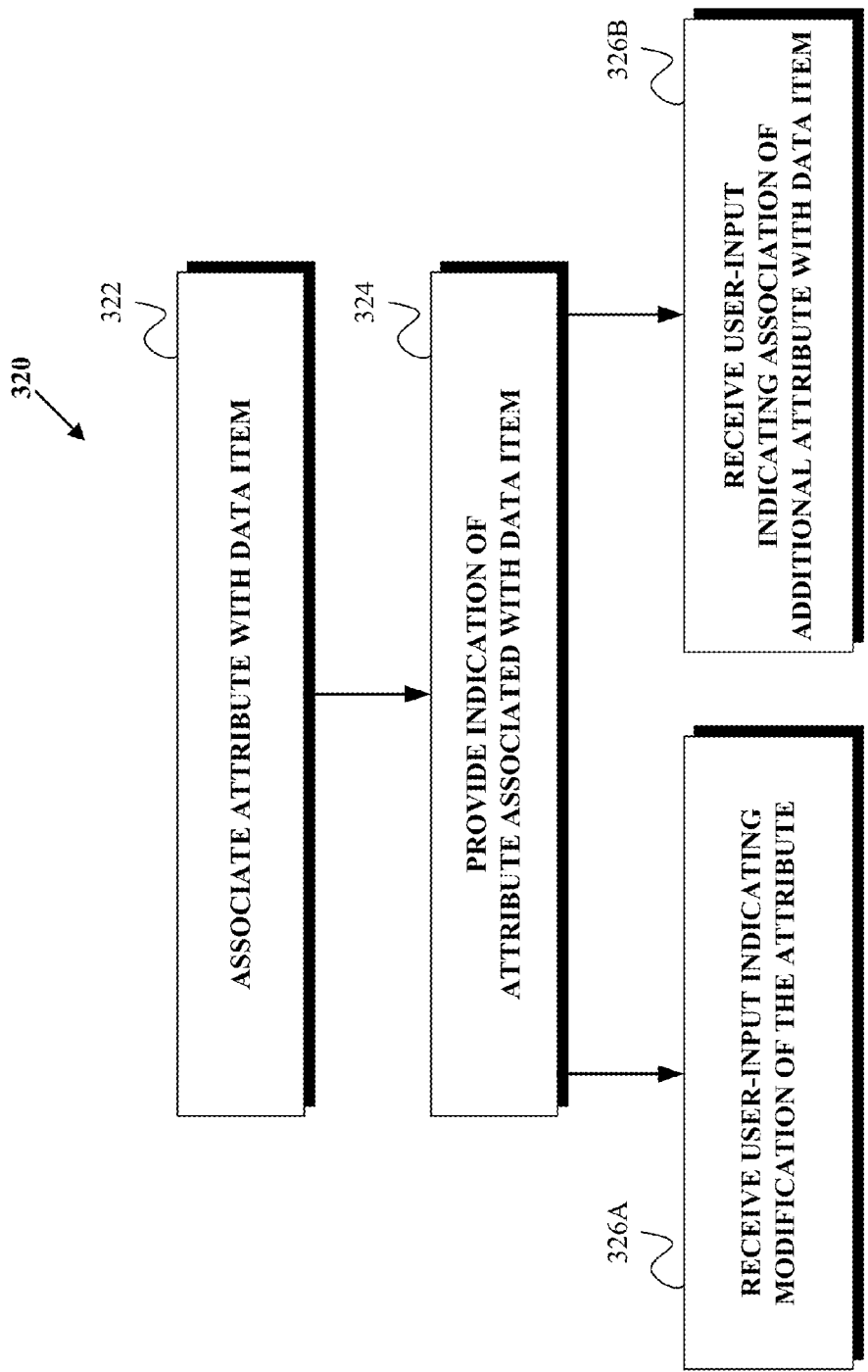
FIGS. 3B-3G each show a flowchart depicting further optional aspects of example methods for presentation of data items based on prioritized associations.

Now, with reference to FIG. 3B, a further aspect of the methods disclosed herein may include example method 320, which may be carried out in addition to, or instead of, certain aspects the methods described herein. Method 320 includes block 322, where computing system 500 automatically respectively associates one or more attributes from set of attributes 604 with each data item 602. At block 324, after automatically respectively associating one or more attributes 604 with each data item 602, computing system 500 provides an indication of at least one attribute associated with at least one data item. After providing the indication of the at least one attribute associated with at least one data item, computing system 500 may carry out either, or both of the functions shown with respect to blocks 326A and 326B. At block 326A, computing system 500 may receive a user-input indicating a modification of the at least one attribute. And at block 326B, computing system 500 may receive a user-input indicating an association of at least one additional attribute from set of attributes 604 with the data item.

At block 322, computing system 500 automatically respectively associates one or more attributes from set of attributes 604 with each data item 602. With reference to FIG. 5, such an association may be performed by association module 508. In an embodiment, associating a given attribute with a given data item may include generating non-zero (or non-null) data in a cell of attribute-association database table 600 that corresponds to each of the given data item and the attribute. For example, with reference to attribute-association database table 600, the cell associated with data item 3 and attribute 3 contains no data. Accordingly, it may be inferred that no association exists between data item 3 and attribute 3. However, the cell associated with data item 2 and attribute 3, contains non-zero (or non-null) values for each of the attribute value 606, associative value 608, and temporal-decay value 610 fields. Accordingly, it may be inferred that an association exists between data item 2 and attribute 3, and the values of each of attribute value 606, associative value 608, and temporal-decay value 610 provide an indication of the extent of that association. Specifically, data item 2 and attribute 3 are shown as having an association that includes an associative value of 4 and a temporal-decay value of 3.

As another example, the cell associated with data item 4 and attribute 2, also contains non-zero (or non-null) values for each of the attribute value 606, associative value 608, and temporal-decay value 610 fields. Accordingly, it may be inferred that an association exists between data item 4 and attribute 2. Specifically, data item 4 and attribute 2 are shown as having an association that includes an associative value of 5 and a temporal-decay value of 5. In at least this respect, the association between data item 4 and attribute 2 may be considered stronger than the association between data item 2 and attribute 3.

At block 324, after automatically respectively associating one or more attributes 604 with each data item 602, computing system 500 provides an indication of at least one attribute associated with at least one data item. Computing system 500 may provide such an indication of the at least one attribute by way of output device 516, which is coupled to output interface 514. Output interface 514 may be, for example and without limitation, a graphical display such as graphical display 252 shown with respect to computing system 250. Further, in an embodiment, output device 516 may include a heads-up display such as that described with respect FIGS. 1A and 1B. The indication of the at least one attribute may be provided as part of a graphical user interface (GUI), or other management interface, that enables the user to observe and interact with the indicated attribute.

Accordingly, at block 326A, computing system 500 may receive a user-input indicating a modification of the at least one attribute. The user may provide such an input by using any one of input sources 502, or by using a user-interface device 261 as described with respect to computing system 250. As one example, the user may eliminate (remove) the association between a given indicated attribute and a respective data item. As another example, the user may increase the association between the given indicated attribute and a respective data item, perhaps by causing the computing system to assign a higher value to the associative value of the indicated attribute and respective data item. As another example, the user may decrease the association between the given indicated attribute and a respective data item, perhaps by causing the computing system to assign a lower value to the associative value of the indicated attribute and respective data item.

Alternatively, or in addition to, block 326A, at block 326B, computing system 500 may receive a user-input indicating an association of at least one additional attribute from set of attributes 604 with the data item. For example, in the event that association module 508 fails to associate every attribute that the user desires to have associated with the data item, the user may manually cause a given attribute to be associated with the data item. Thus, by utilizing those functions described with respect to block 326A and 326B, the systems and methods described herein provide an attribute-relationship-management system whereby association module 508 may automatically associate attributes with data items and whereby a user may manually modify, or supplement, the associations automatically made by association module 508.

Thus, in an embodiment, computing system 500 may associate one or more attributes with a given data item by setting the associative value and/or the temporal-decay value equal to a non-zero default value. Further, computing system 500 may associate the one or more attributes from the set of attributes, respectively, with each data item, where associating the one or more attributes from the set of attributes, respectively, with each data item includes at least one of automatically associating the one or more attributes with each data item and receiving a user-input indicating that the one or more attributes is associated with each data item, and where the one or more attributes from the set of attributes is at least one of an environmental attribute comprising at least one of a time attribute, a location attribute, a temperature attribute, a motion attribute, and an audio attribute, a data-processed attribute generated based on an analysis of each data item, and a computing-usage attribute based on at least an access history of each data item.

In an embodiment, computing system 500 may store one or more data items in local data storage, and/or may store one or more data items in network-based data storage. Computing system 500 may store the data items in various storage locations based on the attributes associated with the data item. For example, computing system 500 may select a data-storage location for at least one data item from set of data items 602 based on the respective temporal-decay value of the one or more attributes of the at least one data item and the respective associative value of the one or more attributes of the at least one data item. The selected data-storage location may be at least one of random access memory (RAM) (e.g., system memory 258 shown in FIG. 2B), a local data-storage device (e.g., one of storage devices 266 shown in FIG. 2B), and a network-based data-storage device (e.g., a storage device contained in remote device 206 as shown in FIG. 2A). After selecting such a storage device, computing system 500 may cause the at least one data item to be stored in the selected data-storage location. As a general matter, data items that have a relatively large number of strongly associated attributes may be stored in RAM or a local data-storage device for relatively quick access; alternatively, data items that have a relatively small number of strongly associated attributes may be stored in a network-based data-storage device.

Figure 3C:
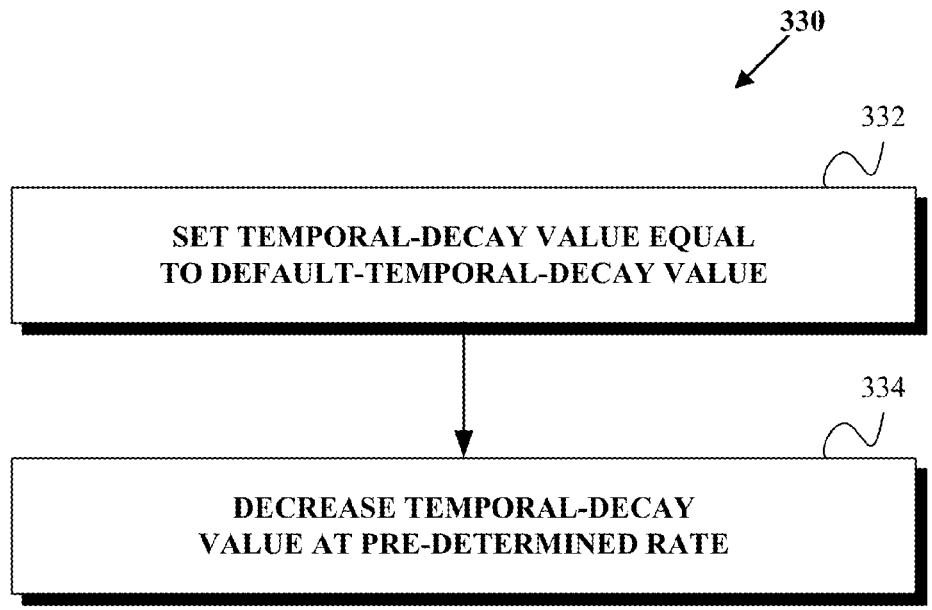

Now, with reference to FIG. 3C, a further aspect of the methods disclosed herein may include example method 330, which may be carried out in addition to, or instead of, certain aspects of the methods described herein. Method 330 includes block 332, where, for at least one data item from set of data items 602, computing system 500 sets the temporal-decay value of one or more attributes of the at least one data item equal to a default-temporal-decay value. And at block 334, computing system 500 decreases the temporal-decay value of the one or more attributes of the at least one data item at a pre-determined rate over a period of time during which the first data item is not accessed by computing system 500. The pre-determined rate may be one of, for example and without limitation, a linear rate of decay and an exponential rate of decay.

Figure 7:
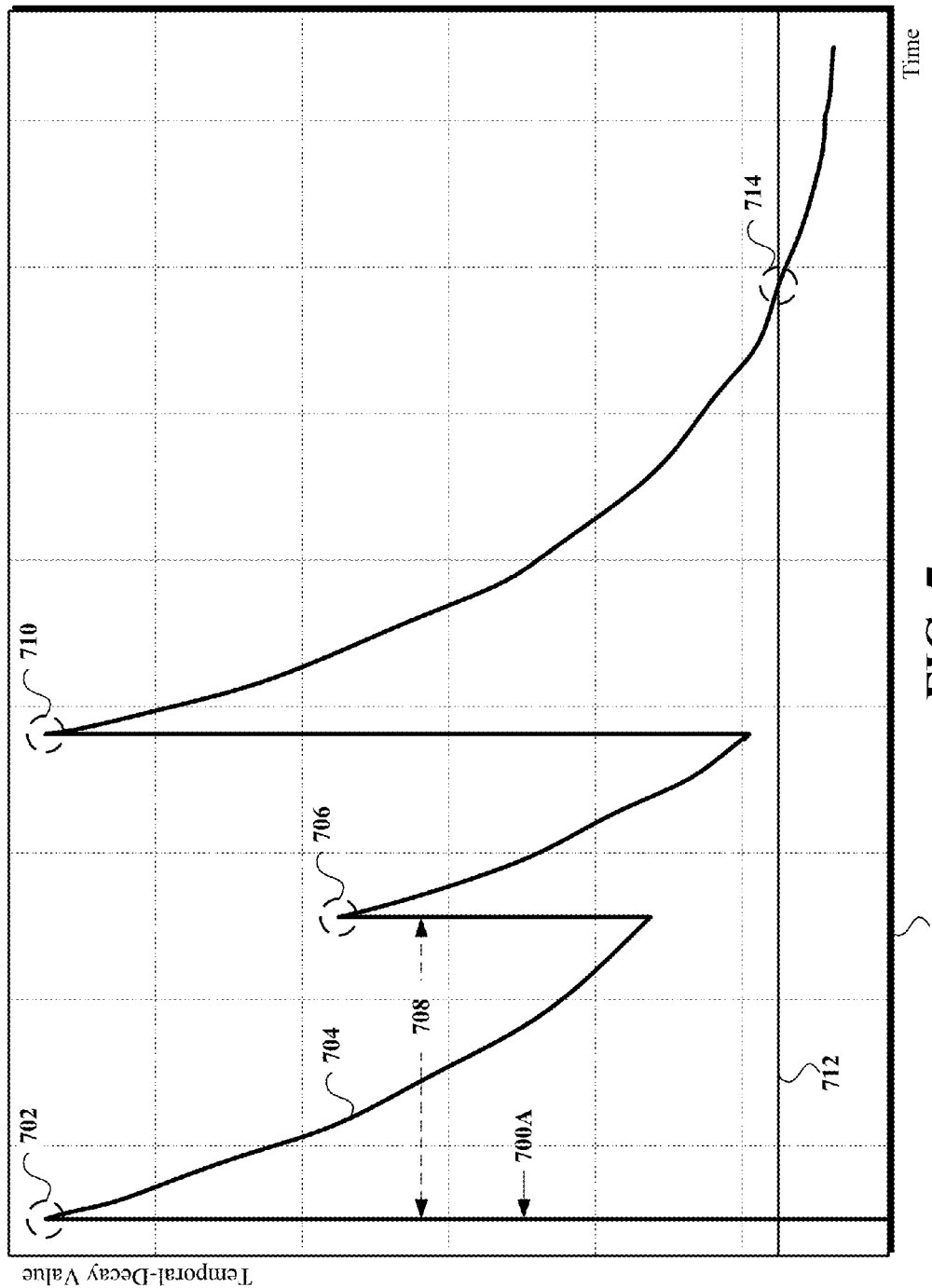
FIG. 7 shows an example temporal-decay value chart in accordance with an example embodiment.

At block 332, for at least one data item from set of data items 602, computing system 500 sets the temporal-decay value of one or more attributes of the at least one data item equal to a default-temporal-decay value. For purposes of example and explanation, FIG. 7 shows an example temporal-decay-value chart 700 in accordance with an example embodiment. Temporal-decay-value chart 700 shows, along the vertical axis, an example temporal-decay value 700A of a given attribute for a given data item, and shows, along the horizontal axis, time. Thus, as shown in FIG. 7, temporal-decay value 700A may vary in time.

At point 702, computing system 500 associates the attribute with the data item by setting temporal-decay value 700A equal to a default-temporal-decay value. It should be understood that the values of temporal-decay value 700A shown, or otherwise implied, by temporal-decay-value chart 700 are for purposes of example and explanation only, and further, are not necessarily intended to represent actual, or even realistic, temporal-decay values. The depictions contained in temporal-decay-value chart 700 should therefore not be taken as limiting.

At block 334, computing system 500 decreases temporal-decay value 700A of the one or more attributes of the at least one data item at a pre-determined rate over a period of time 708 during which the first data item is not accessed by computing system 500. Accordingly, in the example shown by temporal-decay-value chart 700, during the time period between point 702 and 706, temporal-decay value 700A is shown as decreasing according to an approximately exponential rate 704. It should be understood that the exponential rate of decrease shown in FIG. 7 is for purposes of example and explanation only and therefore should not be taken to be limiting. Computing system 500 may be configured such that temporal-decay value 700A decreases according to any desirable function, equation, or rate.

Figure 8:
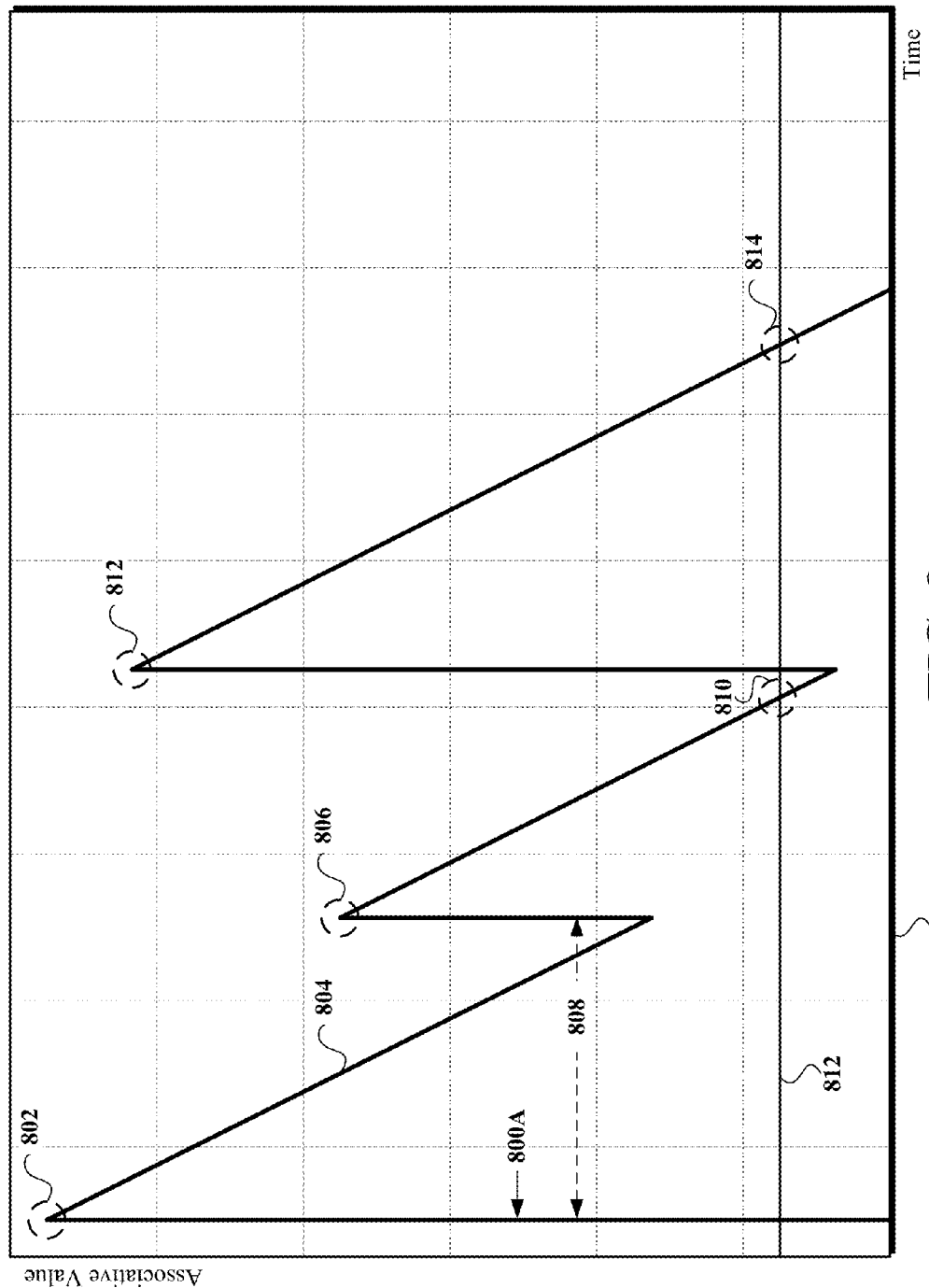
FIG. 8 shows an example associative value chart in accordance with an example embodiment.

Similarly, for at least one data item from set of data items 602, computing system 500 may set the associative value of one or more attributes of at least one data item equal to a default-associative value. For purposes of example and explanation, FIG. 8 shows an example associative-value chart 800 in accordance with an example embodiment. Associative-value chart 800 shows, along the vertical axis, an example associative value 800A of a given attribute for a given data item, and shows, along the horizontal axis, time. Thus, as shown in FIG. 8, associative value 800A may vary in time.

At point 802, computing system 500 associates the attribute with the data item by setting associative value 800A equal to a default-associative value. It should be understood that the values of associative value 800A shown, or otherwise implied, by associative-value 800 are for purposes of example and explanation only, and further, are not necessarily intended to represent actual, or even realistic, associative values. The depictions contained in associative-value chart 800 should therefore not be taken as limiting.

Computing system 500 may decrease associative value 800A of the one or more attributes of the at least one data item at a pre-determined rate over a period of time 808 during which the first data item is not accessed by computing system 500. Accordingly, in the example shown by associative-value chart 800, during the time period between point 802 and 806, associative value 800A is shown as decreasing according to an approximately linear rate 804. It should be understood that the linear rate of decrease shown in FIG. 8 is for purposes of example and explanation only and therefore should not be taken to be limiting. Computing system 500 may be configured such that associative value 800A decreases according to any desirable function, equation, or rate.

Figure 3D:
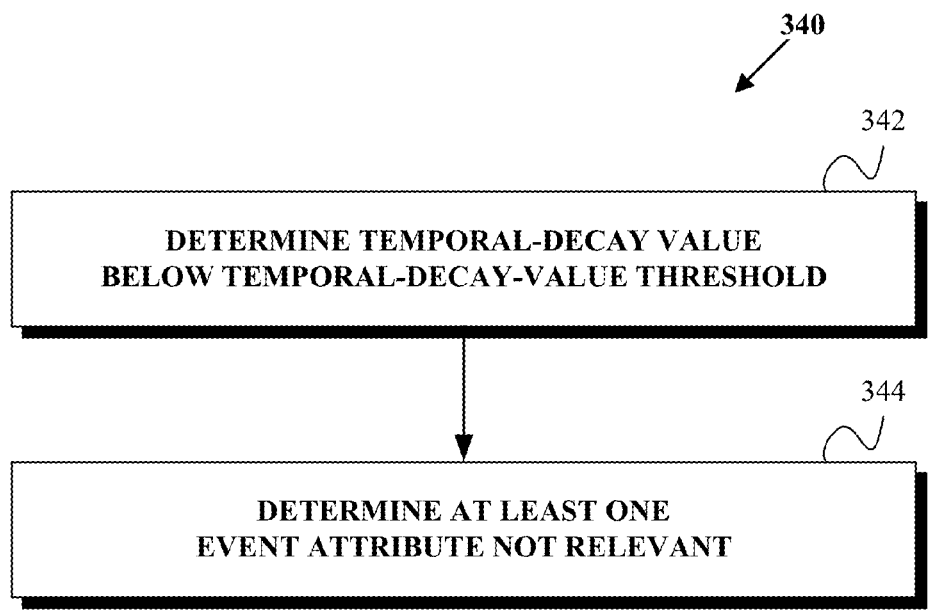

Now, with reference to FIG. 3D, a further aspect of the methods disclosed herein may include example method 340, which may be carried out in addition to, or instead of, certain aspects of the methods described herein. Method 340 includes block 342, where computing system 500 determines that temporal-decay value 700A of a given attribute is below a temporal-decay-value threshold 712. And at block 344, computing system 500 determines that the given attribute is not relevant.

At block 342, computing system 500 determines that temporal-decay value 700A of a given attribute is below a temporal-decay-value threshold 712. As shown in temporal-decay-value chart 700 temporal-decay value 700A drops below temporal-decay-value threshold 712 at point 714. Temporal-decay-value threshold 712 may be set at any desirable value, and may be set depending upon the particular temporal-decay function according to which temporal-decay value 700A decreases. As a general matter, temporal-decay-value threshold 712 may be set to be equal to a temporal-decay value that suggests that the associated attribute is not relevant to the data item.

Accordingly, at block 344, computing system 500 determines that the given attribute is not relevant. That is, upon temporal-decay value 700 reaching point 718, computing system 500 may determine that the given attribute is no longer relevant to the data item. Accordingly, in attribute-association database table 600, computing system 500 may set all entries in the cell of the given attribute and data item equal to zero (or null) so as to indicate that no association between the given attribute and data item exists. Alternatively, computing system 500 may set less than all entries (e.g., only the temporal-decay value) in the cell of the given attribute and data item equal to zero (or null).

Similarly, as shown in associative-value chart 800 associative value 800A drops below associative-value threshold 812 at point 810 and point 814. Associative-value threshold 812 may be set at any desirable value, and may be set depending upon the particular associative value function according to which associative value 800A decreases. As a general matter, associative-value threshold 812 may be set to be equal to an associative value that suggests that the associated attribute is not relevant to the data item.

Upon associative value 800 reaching point 812, computing system 500 may determine that the given attribute is no longer relevant to the data item. Accordingly, in attribute-association database table 600, computing system 500 may set all entries in the cell of the given attribute and data item equal to zero (or null) so as to indicate that no association between the given attribute and data item exists. Alternatively, computing system 500 may set less than all entries (e.g., only the associative value) in the cell of the given attribute and data item equal to zero (or null).

Figure 3E:
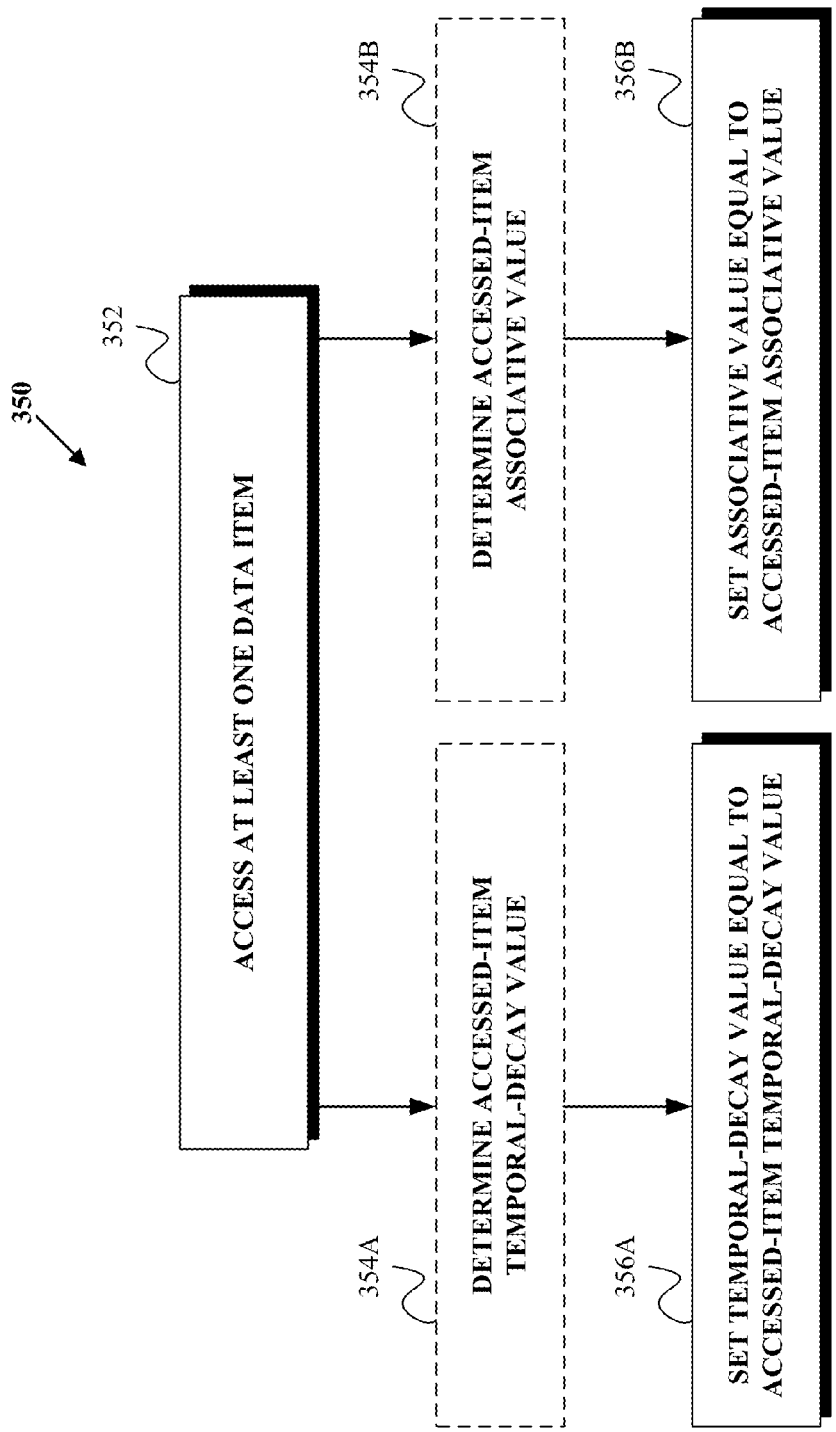

Now, with reference to FIG. 3E, a further aspect of the methods disclosed herein may include example method 350, which may be carried out in addition to, or instead of, certain aspects of the methods described herein. Method 350 includes block 352, where computing system 500 accesses at least one data item from the set of data items. At optional block 354A, computing system 500 determines an accessed-item temporal-decay value based on at least an access history of the at least one data item. At block 356A, responsive to accessing the at least one data item, computing system 500 sets the temporal-decay value of each attribute of the at least one data item equal to an accessed-item temporal-decay value. At optional block 354B, computing system 500 determines an accessed-item associative value based on at least an access history of the at least one data item. At block 356B, responsive to accessing the at least one data item, computing system 500 sets the associative value of each attribute of the at least one data item equal to an accessed-item associative value.

At block 352, computing system 500 accesses at least one data item from the set of data items. Computing system 500 may access the data item in accordance with the methods described herein, or for any other purpose. For example, computing system 500 may open, view, run, read, or otherwise execute the data item in accordance with block 352.

At optional block 354A, computing system 500 determines an accessed-item temporal-decay value based on at least an access history of the at least one data item. The access history of the data item may include any suitable piece of data or information that describes the manner in which the data item has been used, modified, or otherwise accessed by computing system 500. As but a few examples, the access history of a given data item may include at least one of a number of times the computing system previously accessed the at least one data item, a frequency with which the computing system previously accessed the at least one data item, an amount of time since the computing system last accessed the at least one data item, a number of times the computing system previously accessed the at least one data item in association with the attribute, and an access-quality metric of the latest access of the at least one data item. As described above, the access-quality metric may include at least one of a duration of the access of the given data item, a purpose of the access of the given data item, and/or a computing-context of the access of the given data item.

As one particular example of determining an accessed-item temporal-decay value based on an access history of a data item, consider a data item that is a sales chart. Such a sales chart may be used in a series of sales presentations given by a user. Every time the user access the sales chart, the system may not that the sales chart has been accessed. Further, the system may note each time that the sales chart is accessed in accordance with a "sales presentation" attribute. Further still, the system may note that the presentation is accessed in the presence of certain individuals, such as individuals on a sales team, and therefore the system may note that the sales chart is access in accordance with certain attributes reflecting the identity of the sales-team individuals. As a result, the sales presentation may be recalled by the system at some point in the future based on the frequency of access, the "sales presentation" attribute (i.e., when in future sales presentations), or the identity of the sales-team individuals (i.e., when in the presence of such individuals). It should be understood that this is only an example and should not be taken to be limiting.

At block 356A, responsive to accessing the at least one data item, computing system 500 sets the temporal-decay value of each attribute of the at least one data item equal to an accessed-item temporal-decay value. In one embodiment, computing system 500 may set the temporal-decay value equal to a predetermined (or default) accessed-item temporal-decay value. In another embodiment, computing system 500 may determine an accessed-item temporal-decay value based on at least an access history of the at least one data item in accordance with optional block 354A before setting the temporal-decay value of each attribute of the at least one data item equal to the accessed-item temporal-decay value. In accordance with such an embodiment, computing system 500 may set the temporal-decay value equal to the accessed-item temporal decay value determined at optional block 354A. For example, with reference to FIG. 7, computing system 500 is shown as setting temporal-decay value 700A equal to point 706 and 710, after computing system 500 has accessed an associated data item at different points in time.

Similarly, at optional block 354B, computing system 500 determines an accessed-item associative value based on at least an access history of the at least one data item. The access history of the data item may include any suitable piece of data or information including that described above with respect to optional block 354A.

As one particular example of determining an accessed-item associative value based on at least an access history of the at least one data item, consider a data item that is an agenda link. A user may often open the agenda link at a particular time of the week and in a particular spatial location (e.g., in a given conference room). Thus, the system may note the association between the agenda link, the time of the week and the conference room, and/or the co-occurrence of the time and conference-room location. As a result, the agenda link may be recalled by the system at some point in the future based on the time of the week, the user entering a spatial location corresponding to the given conference room, or a co-occurrence of the two. It should be understood that this is only an example and should not be taken to be limiting.

At block 356B, responsive to accessing the at least one data item, computing system 500 sets the associative value of each attribute of the at least one data item equal to an accessed-item associative value. In one embodiment, computing system 500 may set the associative value equal to a predetermined (or default) accessed-item associative value. In another embodiment, computing system 500 may determine an accessed-item associative value based on at least an access history of the at least one data item in accordance with optional block 354B before setting the associative value of each attribute of the at least one data item equal to the accessed-item associative value. In accordance with such an embodiment, computing system 500 may set the associative value equal to the accessed-item associative value determined at optional block 354B. For example, with reference to FIG. 8, computing system 500 is shown as setting associative value 800A equal to point 806 and 812, after computing system 500 has accessed an associated data item at different points in time.

Figure 3F:
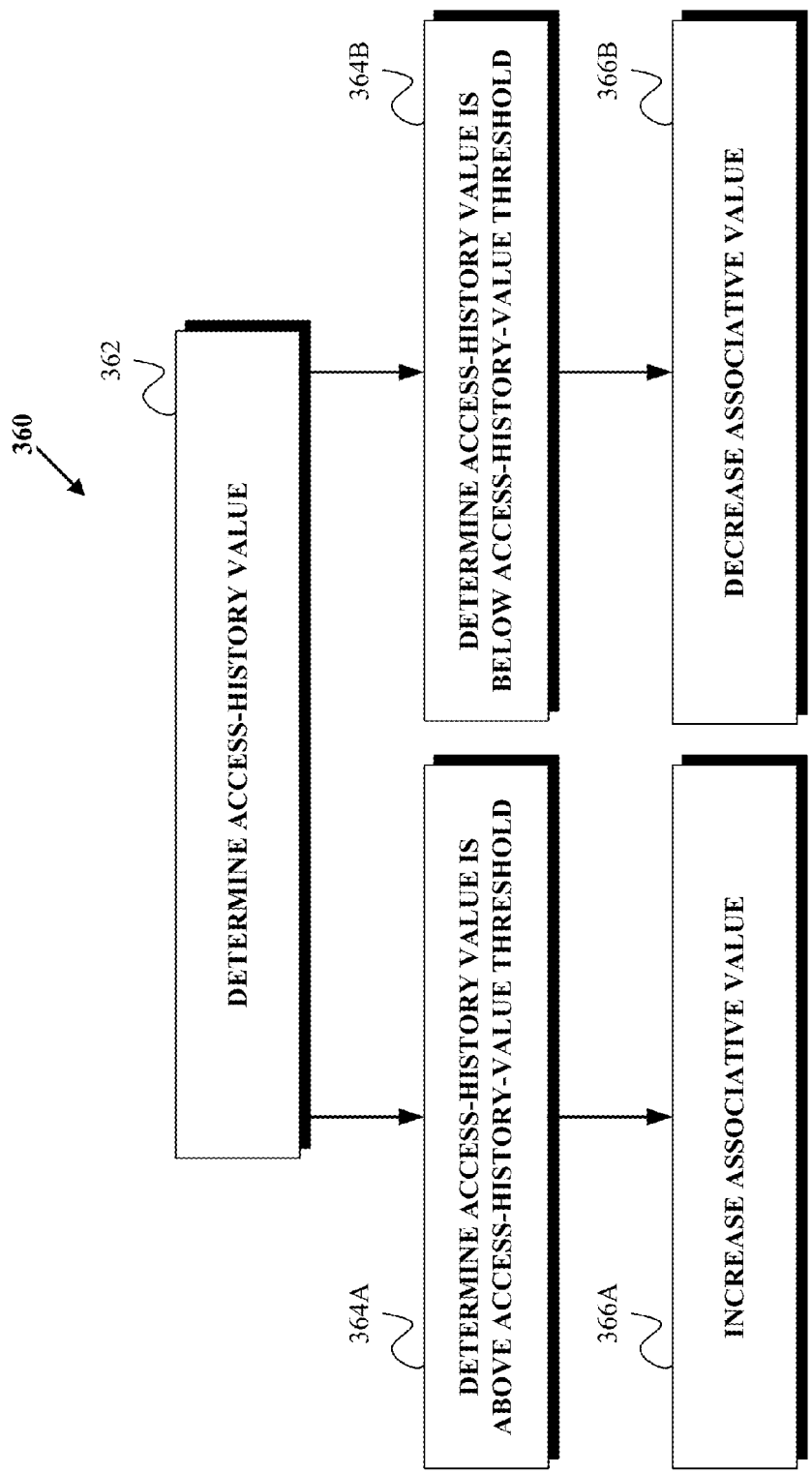

Now, with reference to FIG. 3F, a further aspect of the methods disclosed herein may include example method 360, which may be carried out in addition to, or instead of, certain aspects of the methods described herein. Method 360 includes block 362, where computing system 500 determines an access-history value based on an access history of a given data item. At block 364A, computing system 500 determines that the access-history value is above an access-history value threshold. At block 366A, responsive to the determination that the access-history value is above the access-history threshold, computing system 500 may increase an associative value of an attribute associated with the given data item. At block 364B, computing system 500 determines that the access-history value is below an access-history value threshold. At block 366B, responsive to the determination that the access-history value is below the access-history threshold, computing system 500 may decrease an associative value of an attribute associated with the given data item.

Method 360 includes block 362, where computing system 500 determines an access-history value based on an access history. The access-history value may be determined based on any formula or combination involving the information that may make up the access history as discussed above. For example, the access-history value may be determined based on a summation of the number of times the data item has been accessed. As another example, the access-history value may be determined based on a summation of the number of times the data item has been accessed in a given, most recent, period of time. As another example still, the access-history value may be determined based on the manner, usage, or application by which the data item has been accessed in a given period of time.

At block 364A, computing system 500 determines that the access-history value is above an access-history value threshold. Such an access-history value threshold may be preset at a value that, if exceeded, reflects that the data item possesses a certain relevance with respect to the given attribute. The access-history value threshold may generally be non-zero, however this is not necessary. Further, the access-history value threshold may vary depending on the particular formulas used by, or, more generally, the configuration of, computing system 500.

At block 366A, responsive to the determination that the access-history value is above the access-history threshold, computing system 500 may increase an associative value of an attribute associated with the given data item. In this way, the association between the attribute and the given data item may be strengthened upon a determination that the access history of the data item warrants doing so. The amount of increase in the associative value may vary depending on the particular formulas used by, or, more generally, the configuration of, computing system 500.

At block 364B, computing system 500 determines that the access-history value is below an access-history value threshold. Such an access-history value threshold may be equal to the access-history value threshold discussed above with respect to block 364A, however this is not necessary. That is, the access-history value threshold with respect to block 364B may be preset at a value that, if not exceeded, reflects that the data item fails to possess a certain degree of relevance with respect to the given attribute.

At block 366B, responsive to the determination that the access-history value is below the access-history threshold, computing system 500 may decrease an associative value of an attribute associated with the given data item. In this way, the association between the attribute and the given data item may be weakened upon a determination that the access history of the data items warrants doing so. The amount of decrease in the associative value may vary depending on the particular formulas used by, or, more generally, the configuration of, computing system 500.

ii. Detect Event

Returning now to method 300 as shown in FIG. 3A, at block 304, computing system 500 detects an event, where the event is associated with one or more event attributes, where the event attributes are from the set of attributes 604. As a general matter, detection of an event may involve the receipt and analysis of input data, and/or other signals, by computing system 500. For example, computing system 500 may be configured to receive various forms of input data via any one of input source interfaces 504, and association module 508 may be configured to analyze such input data so as to detect an event. An "event," as described herein, may be any input data that has at least one attribute associated with it. An "event" may take other forms as well.

As shown, computing system 500 includes a number of input-source interfaces 504. In the embodiment shown, input sources 502 include, for example, an application 502A, a microphone 502B, a keyboard 502C, a camera(s) 502D, and a touchpad 502E. A given input-source interface 504 may be configured to interface with and receive data from a single input source 502. Additionally, or alternatively, a given input-source interface 504 may be configured to simultaneously interface with multiple input sources 502.

Configured as such, computing system 500 can receive a number of different modalities of input data from input sources 502, and may receive such inputs simultaneously. In the embodiment shown, computing system 500 may receive, for example, audio data from microphone 502B, text data (or other character data) from keyboard 502C, video data and/or image data from camera(s) 502D, and/or gesture data from touchpad 502E. Thus, in one aspect, computing system 500 may be configured to receive various forms of sensory-input data, such as that as may be received from microphone 502B, camera(s) 502D, and/or other environmental-sensing devices. In another aspect, computing system 500 by be configured to receive various forms of computing-action data, such as that as may be received from application 502A, keyboard 502C, touchpad 502E, and/or other user-input interfaces or devices. Computing system 500 may be configured to receive other modalities of data in addition, or in the alternative, to those described, without departing from the scope of the invention.

Generally, association module 508 may be configured to identify at least one event attribute associated with the received input data. As one example, computing system 500 may receive input data by way of camera(s) 502D in the form of a picture, and association module may be configured to analyze the picture to determine that a given individual is present in the received picture. For instance, association module 508 may use facial-recognition techniques to analyze the faces present in the received picture and make a determination that an individual is present in the received picture. Alternatively, or additionally, coincident with receiving the picture via camera 502D, computing system 500 may receive audio via microphone 502B that includes a statement of the individual's name. Accordingly, association module 508 may use speech-recognition techniques to analyze the received audio and make a determination that the individual's name is present in the received audio. Association module 508 may be further configured to then associate the name present in the received audio with the received picture, given that the audio containing the name was received coincident with the received picture.

As another example, computing system 500 may receive input data by way of application 502A, which may be a word-processing application, in the form of a word-processing document (or other text-entry technique), and association module 508 may be configured to analyze the word-processing document to determine that a given individual is associated with the word-processing document. For instance, association module 508 may investigate metadata of the word-processing document, or may otherwise investigate the contents of the word-processing document file, to determine the original author of the word-processing document. Alternatively, association module 508 may investigate metadata of the word-processing document, or may otherwise investigate the contents of the word-processing document file, to determine a group of individuals who have, at some time, edited the word-processing document. Any such individual's name may then be associated with the word-processing document by association module 508.

As another example still, computing system 500 may receive input data by way of application 502A, which may be an e-mail client, in the form of an e-mail message, and association module 508 may be configured to analyze the received e-mail to determine that a given individual is associated with the e-mail. For instance, association module 508 may investigate the e-mail address, or signature block, contained in the e-mail message, or may otherwise investigate the contents of the e-mail, to determine the sender of the e-mail. Alternatively, association module 508 may investigate the history of the e-mail message to determine individuals that have been copied, or otherwise involved, in the e-mail chain. Any such individual's name may then be associated with the word-processing document by association module 508.

In an embodiment, the at least one event attribute associated with a given data item by association module 508 may be a context attribute. Such a context attribute may be, for example, one of time, location, computing task, physical task, and/or user mood. As a general matter, computing system 500, or association module 508, may identify the context attribute based on at least one of a sensory input, a user-input, or an analysis of the event, similar to the identification of attributes as described above.

However, computing system 500 may also be configured to identify the context attribute based on one or more context signals received from one or more context information sources 518. Many types of information, from many different sources, may serve as context signals or provide information from which context signals may be derived. For example, context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information. Those skilled in the art will understand that the above list of possible context signals and sources of context information is not intended to be limiting, and that other context signals and/or sources of context information are possible in addition, or in the alternative, to those listed above.

In some embodiments, determining a context attribute may involve calculating a quantitative or qualitative value of a single context signal (e.g., the time of the day, a current location, or a user status). The context attribute may also be determined based on a plurality of context signals (e.g., the time of day, the day of the week, and the location of the user). In other embodiments, computing system 500 may extrapolate from the information provided by context signals. For example, a determined user-context may be determined, in part, based on context signals that are provided by a user (e.g., a label for a location such as "work" or "home", or user-provided status information such as "on vacation").

In a further aspect, context information sources 518 may include various sensors that provide context information. These sensors may be included as part of or communicatively coupled to computing system 500. Examples of such sensors include, but are not limited to, a temperature sensor, an accelerometer, a gyroscope, a compass, a barometer, a moisture sensor, one or more electrodes, a shock sensor, one or more chemical sample and/or analysis systems, one or more biological sensors, an ambient light sensor, a microphone, and/or a digital camera, among others. Context information sources 518 may be, or may be similar to, any one of input sources 502.

Computing system 500 may also be configured to acquire context signals from various data sources. For example, context-evaluation modules may be configured to derive information from network-based weather-report feeds, news feeds and/or financial-market feeds, a system clock providing a reference for time-based context signals, and/or a location-determination system (e.g., GPS), among others.

In another aspect, computing system 500 may also be configured to learn, over time, about a user's preferences in certain contexts. For example, whenever an explicit instruction to associate a given context attribute with a given data item is received, computing system 500 may store, in data storage, a record of such an instruction. This record may include the context attribute and/or data item identified by the instruction, as well as context information that is available at or near the receipt of the instruction.

Computing system 500 may periodically evaluate such records and determine a correlation exists between explicit instructions to associate a given context attribute with a given data item, and a certain context. When such a correlation exists, computing system 500 may be updated to specify that the context attribute should be attributed to a given data item upon detection of the corresponding context attribute.

Additionally, or alternatively, an example system may be configured for an "on-the-fly" determination of whether a current context has historically been associated with certain context attributes and data items. In particular, computing system 500 may compare a current context to historical context data, and determine whether certain context attributes have been associated with certain data items. If an association is found, then computing system 500 may automatically associate the given context attribute with the given data item.

The examples of associating a given attribute with a given detected event set forth above are but a few of the many potential examples of approaches, methods, or techniques for associating attributes with detected events. Those of skill in the art will appreciate that many other approaches to associating attributes with events in accordance with the disclosure contained herein may exist.

iii. Determine Relevance

Returning again to method 300 as shown in FIG. 3A, at block 306, computing system 500 determines a relevance of a given one of the data items to the detected event based on a selected one or more of (a) the associative values that indicate the association between the attributes and the given data item and (b) the temporal-decay values. As a general matter, determining the relevance of a given data item may involve the analysis of those attributes associated with a given data item by relevance-determination module 510. As such, relevance-determination module 510 may be configured to analyze those attributes associated with the given data item and determine a relevance based thereon.

Generally, determining the relevance of a given one of the data items to the detected event based on a selected one or more of the associative values that indicate the association between the event attributes and the given data item and the temporal-decay values, may involve at least one of a summation of the selected one or more temporal-decay values and the associative values, a weighted summation of the selected one or more temporal-decay values and the associative values, a product of the selected one or more temporal-decay values and the associative values, a weighted product of the selected one or more temporal-decay values and the associative values, an average of the selected one or more temporal-decay values and the associative values, and a weighted average of the selected one or more temporal-decay values and the associative values.

Figure 9:
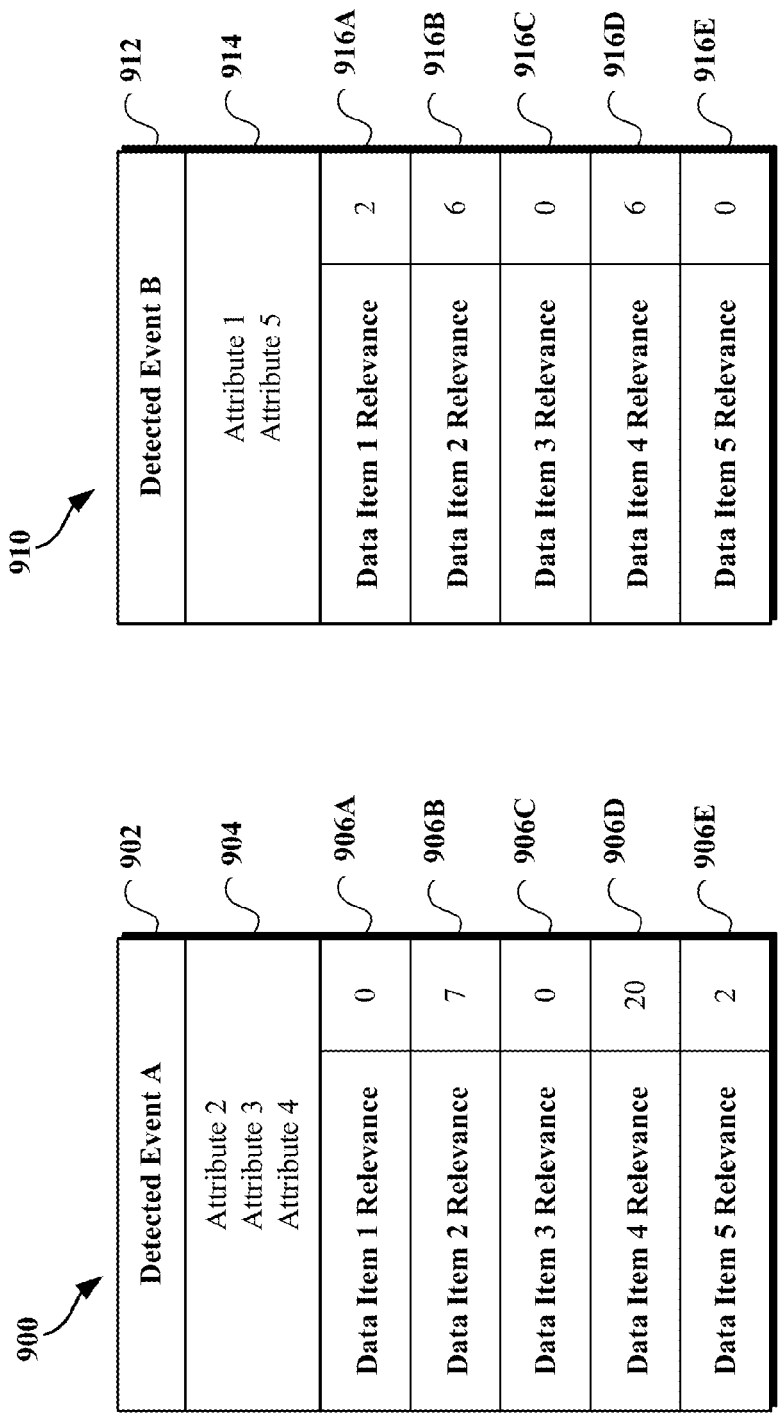
FIG. 9 shows tables containing example data-item relevance values in accordance with an example embodiment.

For purposes of example and explanation, FIG. 9 shows tables containing example data-item relevance values in accordance with an example embodiment. Data-item relevance table 900 shows data-item relevance values for Detected Event A 902 having a set of attributes 904 that includes attribute 2, 3, and 4. In the example shown by data-item relevance table 900, data-item relevancies 906A-906E are determined according to a summation of the temporal-decay values and the associative values of each attribute of Detected Event A 902 that is associated with the data item. For example, with reference to attribute-association database table 600, data item 1 is not associated with any of attributes 2, 3, or 4. Therefore, the data-item 1 relevance 906A is 0. Of attributes 2, 3, and 4, data item 2 is associated with attribute 3. Therefore, the data-item 2 relevance 906B is 7. Data item 3 is not associated with any of attributes 2, 3, or 4. Therefore, the data-item 3 relevance 906C is 0. Of attributes 2, 3, and 4, data item 4 is associated with attributes 2 and 4. Therefore, the data item 4 relevance 906D is 20. Of attributes 2, 3, and 4, data item 5 is associated with attribute 3. Therefore, the data item 5 relevance 906E is 2.

Data-item relevance table 910 shows data-item relevance values for Detected Event B 912 having a set of attribute 914 that includes attribute 1 and 5. In the example shown by data-item relevance table 910, data-item relevancies 916A-916E are determined according to a product of the selected one or more temporal-decay values and the associative values of each attribute of Detected Event B 912 that is associated with the data item. For example, with reference to attribute-association database table 600, of attributes 1 and 5, data item 1 is associated with attribute 1. Therefore, the data-item 1 relevance 916A is 2. Of attributes 1 and 5, data item 2 is associated with attribute 1. Therefore, the data-item 2 relevance 916B is 6. Data item 3 is not associated with any of attributes 1 and 5. Therefore, the data-item 3 relevance 916C is 0. Of attributes 1 and 5, data item 4 is associated with attribute 5. Therefore, the data-item 4 relevance 916D is 6. Data item 5 is not associated with any of attributes 1 and 5. Therefore, the data-item 5 relevance 916E is 0.

iv. Select at Least One Data Item

At block 308, the computing system selects at least one data item, where the at least one data item is selected from a set of the data items based on the respective relevancies of the data items in the set. As a general matter, selection of the at least one data item may involve the analysis, by data-item-selection module 512, of relevancies of various data items as determined in accordance with block 306. As such, data-item-selection module 512 may be configured to analyze the relevancies of various data items and select at least one data item based thereon.

In an embodiment, data-item-selection module 512 may be configured to select the data item having the greatest relevancy. In another embodiment, data-item selection module 512 may be configured to select a predetermined number of data items having the greatest relevancies. Other examples exist as well.

As one such example, data-item-selection module 512 may be configured to determine whether the relevance of a given data item is above a relevance threshold. If the relevance of the given data item is above the relevance threshold, data-item-selection module 512 may responsively select the given data item. However, if the relevance of the given data item is not above the relevance threshold, data-item-selection module 512 may decline to select the given data item.

Figure 3G:
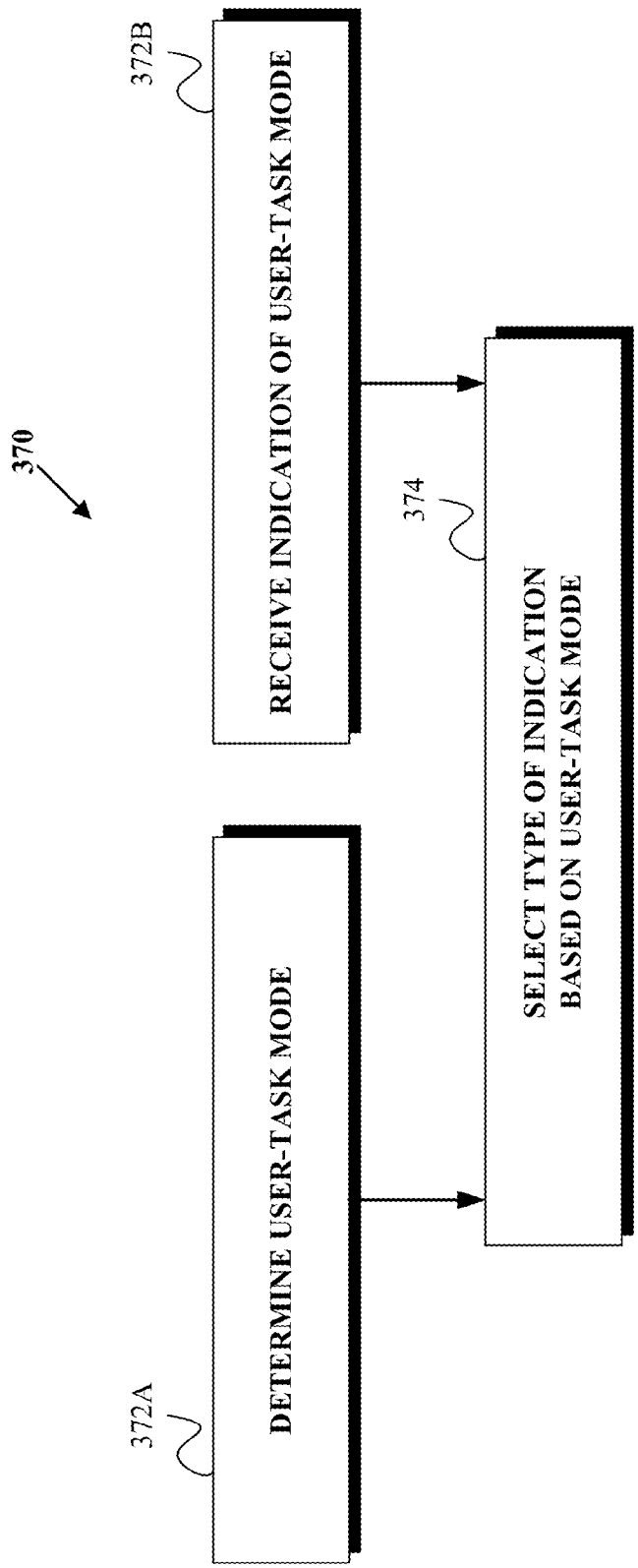

As another such example, and with reference to FIG. 3G, a further aspect of the methods disclosed herein may include example method 370, which may be carried out in addition to, or instead of, certain aspects of the methods described herein. At block 372A, computing system 500 determines a user-task mode based on at least one of (i) at least one event attribute of the detected event and (ii) at least one sensory input. At block 372B, computing system 500 determines a user-task mode based on a user-input indicating the user-task mode. At block 374, computing system 500 selects at least one data item based on at least the determined task mode.

Computing system 500 may be configured to recognize many different types of user-task modes. For example, user-task modes may include: (a) resting, (b) working generally, (c) working on a particular project, (d) at a social event, (e) at a work event, (f) at a family event, (g) at work, (h) in a work meeting, (i) in a particular work meeting, and/or (j) at home. Many other examples of user-task modes may exist.

At block 372A, computing system 500 determines a user-task mode based on at least one of (i) at least one event attribute of the detected event and (ii) at least one sensory input. Accordingly, data-item-selection module 512 may be configured to receive event attributes of the detected event from association module 508. Further, data-item-selection module 512 may be configured to receive sensory inputs from at least one of input sources 502 and context information sources 518, and make a determination as to the user-task mode. As one example, in the case that computing system receives a sensory input that indicates a location associated with the user's home, the user-task mode may be determined to be "at home." As another example, in the event that the computing system receives a sensory input that indicates a location associated with the user's workplace as well as input data that indicates the user is running a given application that is associated with a particular project, the user-task mode may be determined to be "working on the particular project."

At block 372B, computing system 500 determines a user-task mode based on a user-input indicating the user-task mode. That is, instead of inferring the user-task mode based on sensory inputs or other input data, the user may simply explicitly indicate the current user-task mode.

At block 374, computing system 500 selects at least one data item based on at least the determined task mode. That is, as a general matter, data-item-selection module 512 may select different data items depending on the user-task mode. For instance, in the event that a spreadsheet file and a family photo happen to have equal relevancies to a received email, if the user-task mode is "at work," data-item-selection module may select the spreadsheet file and decline to select the family photo. Those of skill in the art will appreciate that many other examples of selecting data items based on user-task mode may exist.

v. Provide Indication of at Least One Selected Data Item

At block 310, the computing system provides an indication of the at least one selected data item via at least one output device, such as output device 516, by way of output interface 514. Generally, providing an indication of the at least one selected data item may involve at least one of providing a visual indication of the at least one selected data item on a graphical display, providing an audible indication of the at least one selected data item via a speaker, and making the at least one selected data item available for browsing via a graphical user interface.

Further, the indication of the at least one selected data item may vary according to the user-task mode. As one example, if the user is in a highly-focused mode of "working on particular project," then computing system 500 might provide an indication of only a single, highly relevant, data item at a given time. As another example, if the user is in a less-focused mode of "resting," then computing system 500 might provide an indication of a large number of data items, each of why may be relevant, so that the user may browse the large number of data items.

b. The Second Example Method

Now with reference to FIG. 4, Example method 400 may be carried about by computing system 500. Example method 400 involves specific types of events (e.g., the detection of a face), specific types of attributes (e.g., a name attribute), and specific types of data items (e.g., a calendar event); however, each of these aspects of method 400 are set forth for purposes of example and explanation only, and should not necessarily be taken to be limiting.

Example method 400 begins at block 402, where computing system 500 maintains attribute-association database 506 comprising data for set of data items 506A, wherein the set of data items comprises a calendar event, and wherein the data for the calendar event specifies, for a name attribute, (a) an associative value that indicates an association between the name attribute and the calendar event, and (b) a temporal-decay value. Accordingly, the calendar event may be any one of data items 602 in attribute-association database 600. Further, the name attribute may be any one of attributes 604 in attribute-association database 600.

At block 404, computing system 500 detects a face in received media. For example, computing system 500 may receive, via one of input-source interfaces 504, image data captured by camera(s) 502D. Association module 508 may then analyze the image data, perhaps using facial-recognition software, and detect the face in the image data.

At block 406, computing system 500 determines contact data that corresponds to the detected face, wherein the contact data includes at least the name attribute. For example, computing system 500 may access data stored in local data storage, or may access data stored in network-based data storage, contact data that corresponds with the detected face. Among other information, the contact data may include at least a name associated with the detected face, for example the name of an individual having the detected face. In this sense, the name attribute is recognized as an attribute of the image file.

At block 408, computing system 500 determines a relevance of the calendar event to the detected face based on a selected one or more of (a) the associative value that indicates the association between the name attribute and the calendar event and (b) the temporal-decay value. The relevance of the calendar event to the detected face may be determined in accordance with those functions described above with respect to block 306 of method 300.

At block 410, computing system 500 selects the calendar event based on the relevance of the calendar event. The selection of the calendar event based on the relevance of the calendar event may be carried out in accordance with those functions described above with respect to block 308 of method 300. For instance, the calendar event may be selected from among a number of additional calendar events that do not have as high of a relevancy, with respect to the name attribute, as does the selected calendar event.

At block 412, computing system 500 provides a visual indication of the calendar event via at least one graphical display. The visual indication of the calendar event may be provided by output device 516 of computing system 500, where output device 516 is a graphical display.

4. Conclusion

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A system comprising:
a non-transitory computer readable medium; and
program instructions stored on the non-transitory computer readable medium and executable by at least one processor to:
maintain an attribute-association database comprising data for a set of data items, wherein the data for a given one of the data items specifies, for each of one or more attributes from a set of attributes: (a) an associative value that indicates an association between the attribute and the data item and (b) a temporal-decay value that is decreased at a pre-determined rate over a period of time during which the first data item is not accessed;
detect an event corresponding to proximity of a first user-information device to an entity associated with a second user-information device, wherein the event is associated with one or more event attributes from the set of attributes, wherein detecting the event comprises:
receiving input data, wherein the input data comprises sensory-input data wherein sensory-input data comprises data that is received from at least one of microphones, camera, accelerometer, gyroscope, compass, electrodes, shock sensor, chemical sample or analysis system, biological sensor, ambient light sensor, thermal sensor, pressure sensor, and humidity sensor; and
identifying at least one event attribute associated with the event based on the received input data;
in response to detecting the event corresponding to proximity of the first user-information device to the entity associated with the second user-information device:
determine a relevance of a given one of the data items to the detected event based on: (a) the associative values that indicate the association between the event attributes and the given data item and (b) the temporal-decay values;
select at least one data item, wherein the at least one data item is selected from a set of the data items based on the respective relevancies of the data items in the set; and
provide an indication of the at least one selected data item via at least one output device.

2. The system of claim 1, wherein the at least one selected data item is one of (i) a multimedia-data object comprising at least one of a picture file, a video file, an audio file, a word-processing file, and an e-mail file, and (ii) a data pointer that specifies the location of at least one data object.

3. The system of claim 1, wherein the input data, further comprises computing-action data.

4. The system of claim 1, further comprising program instructions stored on the non-transitory computer readable medium and executable by at least one processor to cause a computing device to:
associate the one or more attributes from the set of attributes, respectively, with each data item, wherein associating the one or more attributes from the set of attributes, respectively, with each data item comprises at least one of (i) automatically associating the one or more attributes with each data item and (ii) receiving a user-input indicating that the one or more attributes is associated with each data item, and wherein the one or more attributes from the set of attributes is at least one of (i) an environmental attribute comprising at least one of a time attribute, a location attribute, a temperature attribute, a motion attribute, and an audio attribute, (ii) a data-processed attribute generated based on an analysis of each data item, and (iii) a computing-usage attribute based on at least an access history of each data item.

5. The system of claim 4, wherein respectively associating the one or more attributes from the set of attributes with each data item comprises automatically respectively associating the one or more attributes with each data item, the system further comprising program instructions stored on the non-transitory computer readable medium and executable by at least one processor to cause a computing device to:
after automatically respectively associating the one or more attributes with each data item, provide an indication of at least one attribute associated with at least one data item; and
after providing the indication of the at least one attribute associated with at least one data item, receive a user-input indicating at least one of (i) a modification of the at least one attribute and (ii) an association of at least one additional attribute from the set of attributes with the data item.

6. The system of claim 1, further comprising program instructions stored on the non-transitory computer readable medium and executable by at least one processor to cause a computing device to:
select a data-storage location for at least one data item from the set of data items based on (i) the respective temporal-decay value of the one or more attributes of the at least one data item and (ii) the respective associative value of the one or more attributes of the at least one data item, wherein the data-storage location is at least one of (i) random access memory (RAM), (ii) a local data-storage device, and (iii) a network-based data-storage device; and
cause the at least one data item to be stored in the selected data-storage location.

7. The system of claim 1, wherein determining the relevance of a given one of the data items to the detected event based on a selected one or more of (a) the associative values that indicate the association between the attributes and the given data item and (b) the temporal-decay values, comprises at least one of (i) a summation of the selected one or more temporal-decay values and the associative values, (ii) a weighted summation of the selected one or more temporal-decay values and the associative values, (iii) a product of the selected one or more temporal-decay values and the associative values, (iv) a weighted product of the selected one or more temporal-decay values and the associative values, (v) an average of the selected one or more temporal-decay values and the associative values, and (vi) a weighted average of the selected one or more temporal-decay values and the associative values.

8. The system of claim 1, wherein the pre-determined rate comprises at least one of (i) a linear rate of decay and (ii) an exponential rate of decay, the system further comprising program instructions stored on the non-transitory computer readable medium and executable by at least one processor to cause a computing device to:

for at least one data item from the set of data items, set the temporal-decay value of the one or more attributes of the at least one data item equal to a default-temporal-decay value.

9. The system of claim 1, further comprising program instructions stored on the non-transitory computer readable medium and executable by at least one processor to cause a computing device to:
  determine that the temporal-decay value of at least one event attribute is below a temporal-decay-value threshold; and
  responsively determine that the at least one event attribute is not relevant.

10. The system of claim 1, further comprising program instructions stored on the non-transitory computer readable medium and executable by at least one processor to cause a computing device to:
  access at least one data item from the set of data items;
  responsive to accessing the at least one data item, (i) set the temporal-decay value of each attribute of the at least one data item equal to an accessed-item temporal-decay value and (ii) set the associative value of each attribute of the at least one data item equal to an accessed-item associative value.

11. The system of claim 10, further comprising program instructions stored on the non-transitory computer readable medium and executable by at least one processor to cause a computing device to:
  before setting the temporal-decay value of each attribute of the at least one data item equal to the accessed-item temporal-decay value, determine the accessed-item temporal-decay value based on at least an access history of the at least one data item, wherein the access history comprises at least one of (a) a number of times the computing system previously accessed the at least one data item, (b) a frequency with which the computing system previously accessed the at least one data item, (c) an amount of time since the computing system last accessed the at least one data item, (d) a number of times the computing system previously accessed the at least one data item in association with the attribute, and (e) an access-quality metric of the latest access of the at least one data item, wherein the access-quality metric comprises at least one of (i) a duration of the access of the at least one data item, (ii) a purpose of the access of the at least one data item, (iii) a computing-context of the access of the at least one data item.

12. The system of claim 1, further comprising program instructions stored on the non-transitory computer readable medium and executable by at least one processor to cause a computing device to:
  before setting the associative value of each attribute associated with the at least one data item equal to the accessed-item associative value, determine the accessed-item associative value based on at least an access history of the at least one data item, wherein the access history comprises at least one of (a) a number of times the computing system previously accessed the at least one data item, (b) a frequency with which the computing system previously accessed the at least one data item, (c) an amount of time since the computing system last accessed the at least one data item, (d) a number of times the computing system previously accessed the at least one data item in association with the attribute, and (e) an access-quality metric of the latest access of the at least one data item, wherein the access-quality metric comprises at least one of (i) a duration of the access of the at least one data item, (ii) a purpose of the access of the at least one data item, (iii) a computing-context of the access of the at least one data item.

13. The system of claim 12, further comprising program instructions stored on the non-transitory computer readable medium and executable by at least one processor to cause a computing device to:
  determine an access-history value based on the access history; and
  (i) responsive to a determination that the access-history value is above an access-history-value threshold, increase the associative value, and
  (ii) responsive to a determination that the access-history value is below an access-history-value threshold, decrease the associative value.

14. The system of claim 1, the system further comprising program instructions stored on the non-transitory computer readable medium and executable by at least one processor to cause a computing device to:
  determine that the relevance of the given data item is above a relevance threshold; and
  responsively select the given data item.

15. The method of claim 1, wherein the at least one event attribute is a context attribute, and wherein the at least one context attribute is one of time, location, computing task, physical task, and user mood.

16. The system of claim 15, further comprising program instructions stored on the non-transitory computer readable medium and executable by at least one processor to cause a computing device to:
  identify the context attribute based on at least one of (a) a sensory input, (b) a user-input, and (c) an analysis of the event.

17. The system of claim 1, further comprising program instructions stored on the non-transitory computer readable medium and executable by at least one processor to cause a computing device to:
  determine a user-task mode based on at least one of (i) at least one event attribute of the detected event, (ii) at least one sensory input, and (iii) a user-input indicating the user-task mode, wherein selecting the at least one data item comprises selecting the at least one data item based on at least the determined user-task mode.

18. The system of claim 1, wherein providing an indication of the at least one selected data item comprises at least one of (i) providing a visual indication of the at least one selected data item on a graphical display, (ii) providing an audible indication of the at least one selected data item via a speaker, and (iii) making the at least one selected data item available for browsing via a graphical user interface.

19. The system of claim 1, further comprising program instructions stored on the non-transitory computer readable medium and executable by at least one processor to cause a computing device to:
  receive an indication of a user-task mode, wherein the at least one selected data item is associated with the particular user-task mode; and
  select a type of indication of the at least one selected data item based on the indicated user-task mode.

20. The system of claim 1, wherein the system further comprises a head-mountable display, wherein the head-mountable display is configured to (i) provide the indication of the at least one selected data item, (ii) receive user inputs, and (iii) receive sensory inputs.

21. A non-transitory computer readable medium having instructions stored thereon, the instructions comprising:

instructions for maintaining an attribute-association database comprising data for a set of data items, wherein the data for a given one of the data items specifies, for each of one or more attributes from a set of attributes: (a) an associative value that indicates an association between the attribute and the data item and (b) a temporal-decay value that is decreased at a pre-determined rate over a period of time during which the first data item is not accessed;

instructions for detecting an event corresponding to proximity of a first user-information device to an entity associated with a second user-information device, wherein the event is associated with one or more event attributes from the set of attributes, wherein detecting the event comprises:

receiving input data, wherein the input data comprises sensory-input data wherein sensory-input data comprises data that is received from at least one of microphones, camera, accelerometer, gyroscope, compass, electrodes, shock sensor, chemical sample or analysis system, biological sensor, ambient light sensor, thermal sensor, pressure sensor, and humidity sensor; and identifying at least one event attribute associated with the event based on the received data;

in response to detecting the event corresponding to proximity of the first user-information device to the entity associated with the second user-information device:

instructions for determining a relevance of a given one of the data items to the detected event based on: (a) the associative values that indicate the association between the event attributes and the given data item and (b) the temporal-decay values;

instructions for selecting at least one data item, wherein the at least one data item is selected from a set of the data items based on the respective relevancies of the data items in the set; and instructions for providing an indication of the at least one selected data item via at least one output device.

22. The non-transitory computer readable medium of claim 21, further comprises computing-action data.

23. The non-transitory computer readable medium of claim 21, the instructions further comprising:

instructions for associating the one or more attributes from the set of attributes, respectively, with each data item, wherein associating the one or more attributes from the set of attributes, respectively, with each data item comprises at least one of (i) automatically associating the one or more attributes with each data item and (ii) receiving a user-input indicating that the one or more attributes is associated with each data item, and wherein the one or more attributes from the set of attributes is at least one of (i) an environmental attribute comprising at least one of a time attribute, a location attribute, a temperature attribute, a motion attribute, and an audio attribute, (ii) a data-processed attribute generated based on an analysis of each data item, and (iii) a computing-usage attribute based on at least an access history of each data item.

24. The non-transitory computer readable medium of claim 21, the instructions further comprising:

instructions for determining that the relevance of the given data item is above a relevance threshold; and instructions for responsively selecting the given data item.

25. A method comprising:

maintaining an attribute-association database comprising data for a set of data items, wherein the data for a given one of the data items specifies, for each of one or more attributes from a set of attributes: (a) an associative value that indicates an association between the attribute and the data item and (b) a temporal-decay value that is decreased at a pre-determined rate over a period of time during which the first data item is not accessed;

detecting an event corresponding to proximity of a first user-information device to an entity associated with a second user-information device, wherein the event is associated with one or more event attributes from the set of attributes, wherein detecting the event comprises:

receiving input data, wherein the input data comprises sensory-input data wherein sensory-input data comprises data that is received from at least one of microphones, camera, accelerometer, gyroscope, compass, electrodes, shock sensor, chemical sample or analysis system, biological sensor, ambient light sensor, thermal sensor, pressure sensor, and humidity sensor; and identifying at least one event attribute associated with the event based in the received input data;

in response to detecting the event corresponding to proximity of the first user-information device to the entity associated with the second user-information device:

determining a relevance of a given one of the data items to the detected event based on: (a) the associative values that indicate the association between the event attributes and the given data item and (b) the temporal-decay values;

selecting at least one data item, wherein the at least one data item is selected from a set of the data items based on the respective relevancies of the data items in the set; and providing an indication of the at least one selected data item via at least one output device.

26. The method of claim 25, wherein the input data further comprises computing-action data.

27. The method of claim 25, further comprising:

associating the one or more attributes from the set of attributes, respectively, with each data item, wherein associating the one or more attributes from the set of attributes, respectively, with each data item comprises at least one of (i) automatically associating the one or more attributes with each data item and (ii) receiving a user-input indicating that the one or more attributes is associated with each data item, and wherein the one or more attributes from the set of attributes is at least one of (i) an environmental attribute comprising at least one of a time attribute, a location attribute, a temperature attribute, a motion attribute, and an audio attribute, (ii) a data-processed attribute generated based on an analysis of each data item, and (iii) a computing-usage attribute based on at least an access history of each data item.

28. The method of claim 25, further comprising:

determining that the relevance of the given data item is above a relevance threshold; and responsively selecting the given data item.

29. A system comprising:

a non-transitory computer readable medium; and program instructions stored on the non-transitory computer readable medium and executable by at least one processor to:

maintain an attribute-association database comprising data for a set of data items, wherein the set of data items comprises a calendar event, and wherein the data for the calendar event specifies, for a name attribute, (a) an associative value that indicates an association between the name attribute and the calendar event, and (b) a temporal-decay value that is decreased at a pre-determined rate over a period of time during which the first data item is not accessed;

receive media, by a first user-information device in proximity to an entity associated with a second user-information device, wherein receiving media comprises:

receiving input data, wherein the input data comprises sensory-input data wherein sensory-input data comprises data that is received from at least one of microphones, camera, accelerometer, gyroscope, compass, electrodes, shock sensor, chemical sample or analysis system, biological sensor, ambient light sensor, thermal sensor, pressure sensor, and humidity sensor; and detecting at least one attribute associated with the received media based on the received input data, wherein the at least one attribute comprises a face;

in response to detecting an event corresponding to proximity of the first user-information device to the entity associated with the second user-information device:

determine contact data that corresponds to the detected face, wherein the contact data includes at least the name attribute;

determine a relevance of the calendar event to the detected face based on: (a) the associative value that indicates the association between the name attribute and the calendar event and (b) the temporal-decay value;

select the calendar event based on the relevance of the calendar event; and provide a visual indication of the calendar event via at least one graphical display.

\* \* \* \* \*